(12) United States Patent
Kapinos et al.

(10) Patent No.: US 11,199,881 B2
(45) Date of Patent: Dec. 14, 2021

(54) COMPUTING DEVICE

(71) Applicant: Lenovo (Singapore) Pte. Ltd., Singapore (SG)

(72) Inventors: Robert James Kapinos, Durham, NC (US); Robert James Norton, Jr., Raleigh, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/686,915

(22) Filed: Nov. 18, 2019

(65) Prior Publication Data
US 2021/0149457 A1 May 20, 2021

(51) Int. Cl.
*G06F 1/16* (2006.01)
*H04R 3/00* (2006.01)
*H04R 1/02* (2006.01)

(52) U.S. Cl.
CPC .......... *G06F 1/1688* (2013.01); *G06F 1/1616* (2013.01); *H04R 1/028* (2013.01); *H04R 3/00* (2013.01); *H04R 2499/15* (2013.01)

(58) Field of Classification Search
CPC ....................................................... H05K 5/06
See application file for complete search history.

(56) References Cited

U.S. PATENT DOCUMENTS

2020/0169816 A1* 5/2020 Kim .................... H04R 9/06

OTHER PUBLICATIONS

Audioexpress, Microspeakers' Anatomy—How to Design Audio Systems with Very Small Drivers, Jul. 16, 2019 (https://audioxpress.com/article/microspeakers-anatomy-how-to-design-audio-systems-with-very-small-drivers) (12 pages).
Notebookcheck, Laptops 101: Designing a capable laptop audio subsystem, Sep. 2, 2019 (https://www.notebookcheck.net/Laptops-101-Designing-a-capable-laptop-audio-subsystem.430253.0.html) (34 pages)—see, e.g., pp. 5-10.
Lenovo, Hardware Maintenance Manual, Thinkpad Carbon X1, Jul. 2015 (98 pages)—see, e g., pp. 46, 57, 58, 59, 60, 65, and 66 (e g., speakers, speaker assemblies, etc).

* cited by examiner

*Primary Examiner* — Jerry Wu
(74) *Attorney, Agent, or Firm* — Brian J. Pangrle

(57) ABSTRACT

A device can include a housing that includes a bottom shell, a top shell and at least one shell opening; a processor disposed in the housing; memory accessible to the processor and disposed in the housing; audio circuitry disposed in the housing and operatively coupled to the processor; a human interface unit mounted to the housing, operatively coupled to the processor and accessible via the top shell of the housing; a speaker driver mounted to the housing and operatively coupled to the audio circuitry, where the speaker driver is in fluid communication with the at least one shell opening; and an internal acoustic cavity defined by at least one of the bottom shell and the top shell, where the internal acoustic cavity is in fluid communication with the speaker driver.

15 Claims, 14 Drawing Sheets

COMPUTING DEVICE

TECHNICAL FIELD

Subject matter disclosed herein generally relates to technology for computing or other devices.

BACKGROUND

Various types of devices, display devices, computing and display devices, etc. exist that have one or more speakers for sound production.

SUMMARY

A device can include a housing that includes a bottom shell, a top shell and at least one shell opening; a processor disposed in the housing; memory accessible to the processor and disposed in the housing; audio circuitry disposed in the housing and operatively coupled to the processor; a human interface unit mounted to the housing, operatively coupled to the processor and accessible via the top shell of the housing; a speaker driver mounted to the housing and operatively coupled to the audio circuitry, where the speaker driver is in fluid communication with the at least one shell opening; and an internal acoustic cavity defined by at least one of the bottom shell and the top shell, where the internal acoustic cavity is in fluid communication with the speaker driver. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
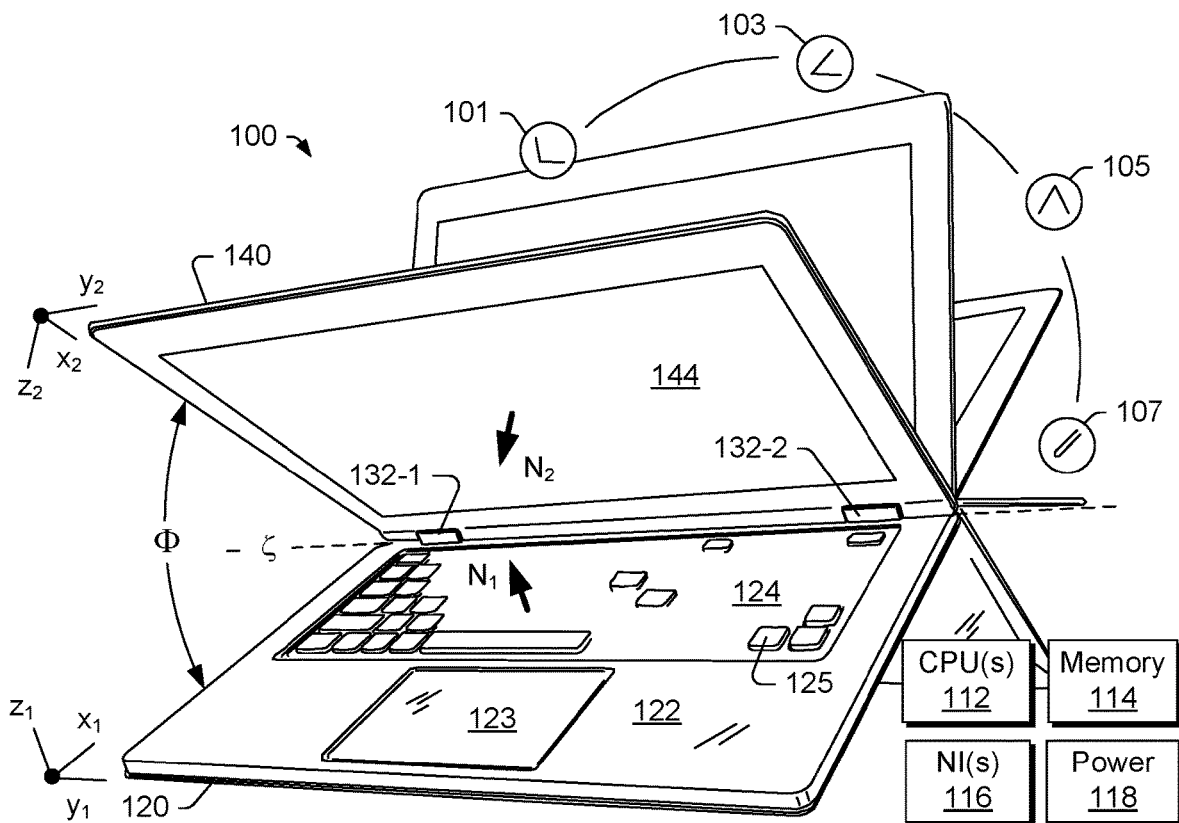
FIG. 1 is a diagram of an example of a device.
Figure 1:
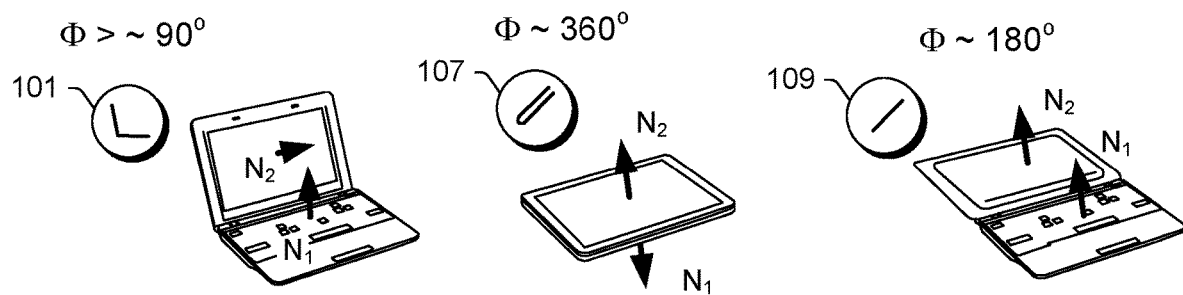

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display housing (a side opposite the display). In such an approach, a user may spin the keyboard housing by 180 degrees about a central axis of the single hinge (e.g., an axis orthogonal to the axis ζ) and then rotate the keyboard housing such that the keys face the back side of the display in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

Figure 2:
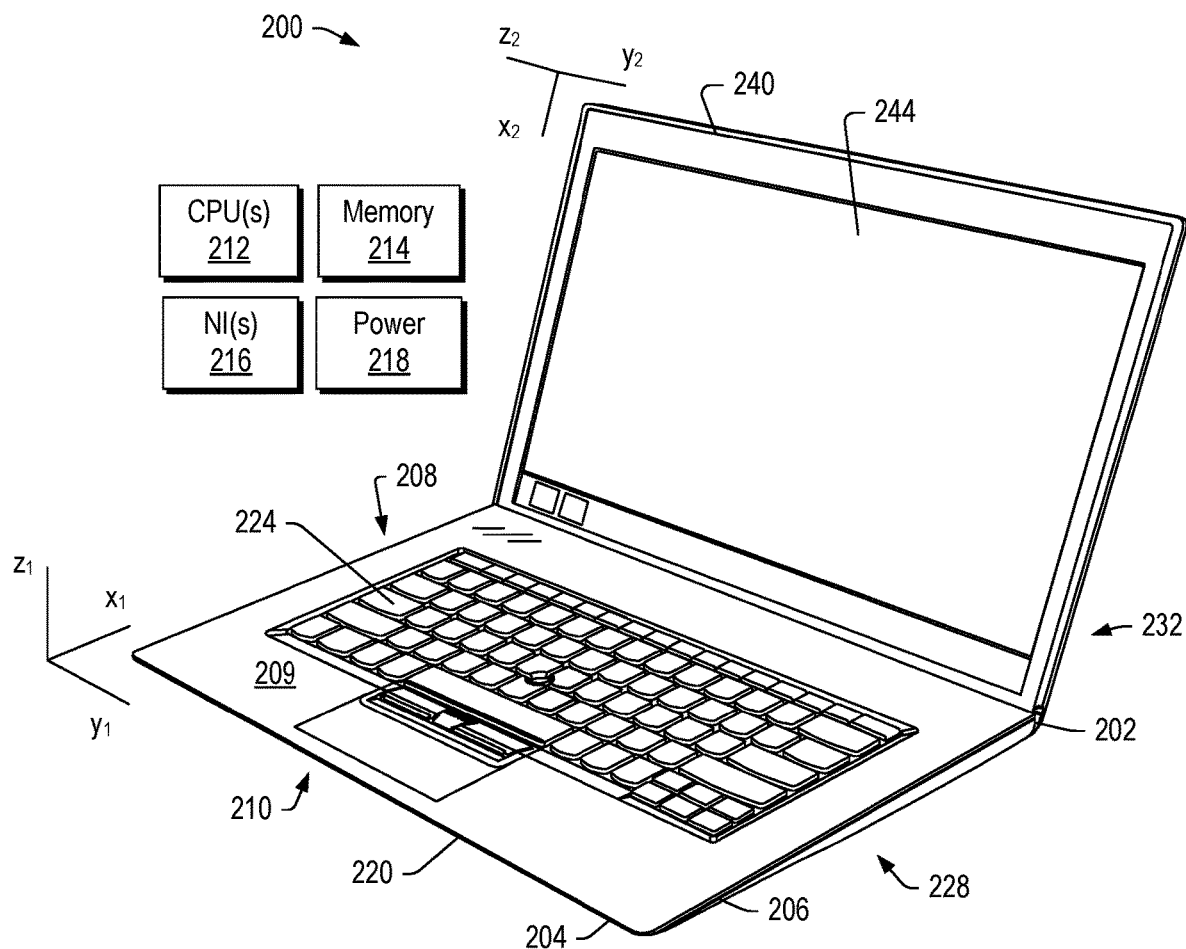
FIG. 2 is a diagram of an example of a device.

FIG. 2 shows an example of a device 200 that includes various features of the device 100 of FIG. 1.

As shown in FIG. 2, the device 200 includes a keyboard housing 220 and a display housing 240 that are pivotable with respect to each other via movement about one or more hinges 232 (e.g., one or more hinge assemblies). The device 200 may be a device such as, for example, a computing device (e.g., an information handling device). As shown, the keyboard housing 220 includes a keyboard 224 (e.g., with typewriter keys) and the display housing 240 includes a display 244.

In the example of FIG. 2, the device 200 includes a hinge assembly side 202, a front side 204, a right side 206, a left side 208, a keyboard side 209 and, opposing keyboard side 209, a bottom side 210. An area defined by the sides 202, 204, 206 and 208 can be a footprint; noting that the bottom side 210 can define a footprint.

As an example, the device 200 may include one or more processors 212, memory 214 (e.g., one or more memory devices), one or more network interfaces 216, and one or more power cells 218. Such components may be, for example, housed with the keyboard housing 220, the display housing 240, and/or the keyboard housing 220 and the display housing 240.

Figure 3:
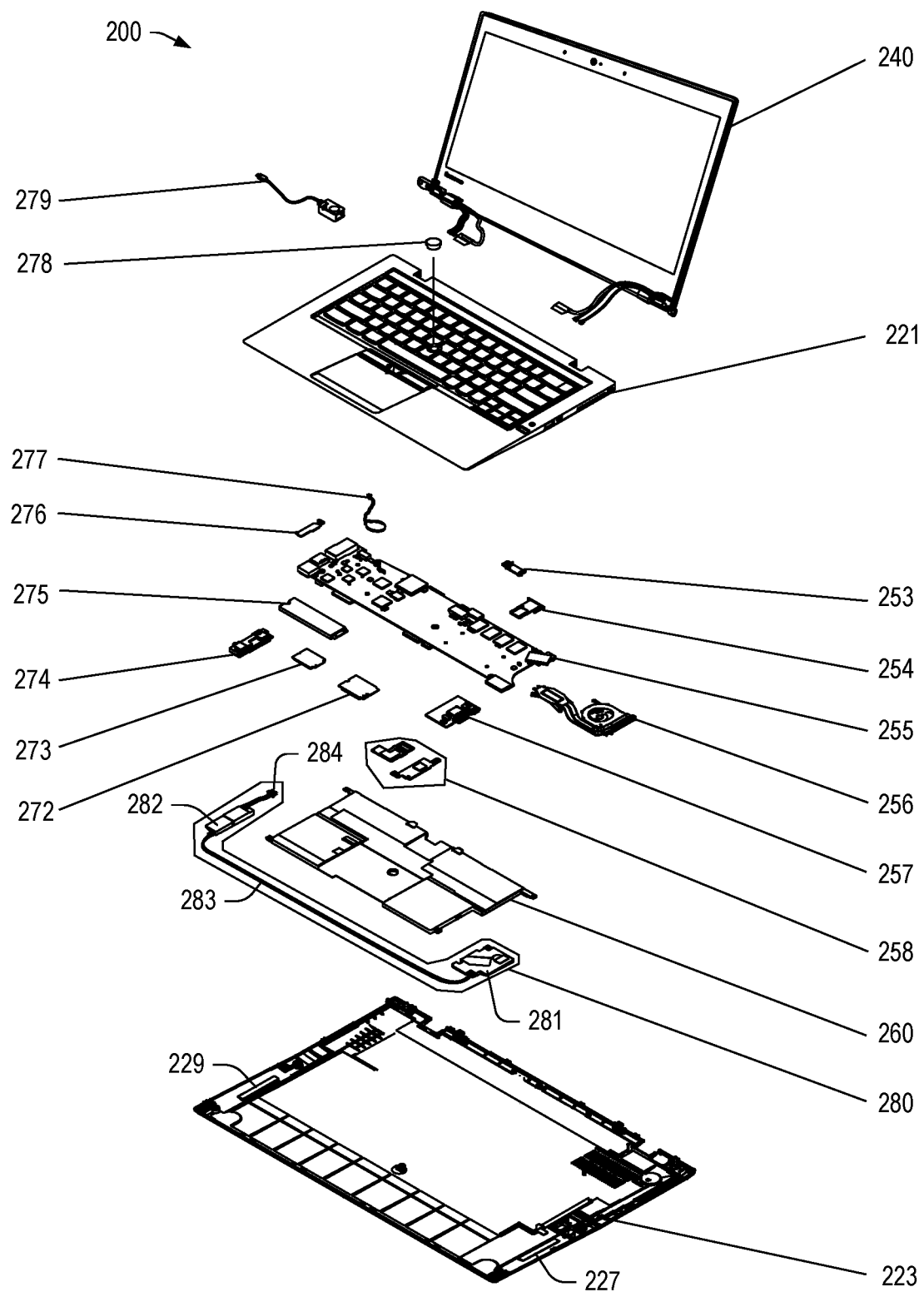
FIG. 3 is a diagram of an example of the device of FIG. 2.

FIG. 3 shows an exploded view of the device 200 of FIG. 2, which shows the display housing 240, an upper assembly of the keyboard housing 221 and a lower assembly of the keyboard housing 223 where the upper assembly of the keyboard housing 221 and the lower assembly of the keyboard housing 223 can be joined to form the keyboard housing 220. As shown, the upper assembly of the keyboard housing 221 includes a keyboard as a human input device. As an example, the lower assembly of the keyboard housing 223 can be a base cover assembly that covers the upper assembly of the keyboard housing 221; noting that various components may be mechanically coupled to the upper assembly of the keyboard housing 221 where, for example, screws, bolts, etc., may be positioned in through bores and/or bosses of the lower assembly of the keyboard housing 223 to thread into bores and/or bosses of the upper assembly of the keyboard housing 221. As an example, during servicing, the lower assembly of the keyboard housing 221 may be removed via unscrewing of screws, bolts, etc., to access various components of the keyboard housing 220.

As an example, a laptop computer can include a display housing that is an assembly that includes one or more covers or shells and can include a keyboard housing that is an assembly that includes one or more covers or shells. For example, a display housing can include an A-cover and a B-cover that mate where the A-cover forms a back side of the display housing and where the B-cover forms a bezel on a front side or display side of the display housing about a display (e.g., a display surface) and, for example, a keyboard housing can include a C-cover and a D-cover that mate where the C-cover forms a front side or a keyboard side of the keyboard housing and where the D-cover forms a back side, bottom side or base side of the keyboard housing. In the example of FIG. 3, the lower assembly of the keyboard housing 223 can be a D-cover assembly that covers the upper assembly of the keyboard housing 221, which can be a C-cover assembly. In such an example, the D-cover assembly and the C-cover assembly can each include a shell such as, for example, a D-cover shell and a C-cover shell. As an example, a tablet can include a top shell that may be or include a bezel (e.g., a display bezel) and a bottom shell. As an example, a display may be a top shell, for example, consider a display that can be attached to a bottom shell to form a housing of a device (e.g., consider a tablet device, a smart phone device, etc.).

As an example, a shell can be a part that is formed by one or more processes such as, for example, molding (e.g., injection molding), 3D printing (e.g., additive manufacturing, etc.), stamping (e.g., metallic sheet stamping), etc. As an example, a shell can include an injection molded part and a stamped part where, for example, the injection molded part is an insert for the stamped part or vice versa.

Various examples of components are shown in FIG. 3, including a SIM card tray bracket 253, a SIM card tray 254, a system board assembly 255 (e.g., a motherboard), a fan 256, an RJ45 card with a USB connector 257, a fingerprint reader assembly 258, a lithium ion battery 260, a speaker assembly 280, a wireless WAN card 272, a wireless LAN card 273, an audio card with a USB connector 274 (e.g., audio circuitry), a M.2 solid-state drive 275, a DC-in bracket 276 (e.g., for DC power), a coin-cell battery (e.g., for back-up power) 277, a trackpoint cap 278 for a trackpoint human input device (HID), and an Ethernet extension adapter 279.

In the example of FIG. 3, the speaker assembly 280 includes a first sub-enclosure 281 for a first speaker driver, a second sub-enclosure 282 for a second speaker driver, a cable 283 and a connector 284. In the example of FIG. 3, the lower assembly of the keyboard housing 223 includes a first speaker opening 227 (e.g., a first speaker vent) and a second speaker opening 229 (e.g., a second speaker vent). In the example of FIG. 3, the first and second speaker drivers in the first and second sub-enclosures 281 and 282 are directed in a direction toward the first and second speaker openings 227 and 229, respectively. In such an arrangement, sound produced emanates from the first and second speaker openings 227 and 229 toward a support surface such as a desktop, a tabletop, a countertop, etc., when the device 200 is supported on such a support surface. Such on-board speakers do not face a user; rather, they may be characterized as facing away from a user (e.g., where the user's hands are positioned with respect to the keyboard 224 of the keyboard housing 220.

In the example of FIG. 3, the sub-enclosures 281 and 282 are positioned in a manner whereby removal of the lithium ion battery 260 occurs before removal of the sub-enclosures 281 and 282. For example, during assembly, the sub-enclosures 281 and 282 are installed prior to installation of the lithium ion battery 260. In such an example, features that secure the lithium ion battery 260 to the upper assembly of the keyboard housing 221 also secure the sub-enclosures 281 and 282 of the speaker assembly 280. As the speaker assembly 280 generates acoustic waves, which may be viewed as vibrational energy, the sub-enclosures 281 and 282 should be secured tightly to the upper assembly of the keyboard housing 221 such that the vibrational energy does not cause loosening, which may result in undesirable movement, wear, etc., of the sub-enclosures 281 and 282 with respect to one or more other components. For example, rubbing may cause insulation of a conductor to wear, may cause a conductor to fail (e.g., interrupt, short, etc.). In the example of FIG. 3, various precautions must be taken with respect to the sub-enclosures 281 and 282 to assure proper operation of the speaker assembly 280 and the device 200.

Figure 4:
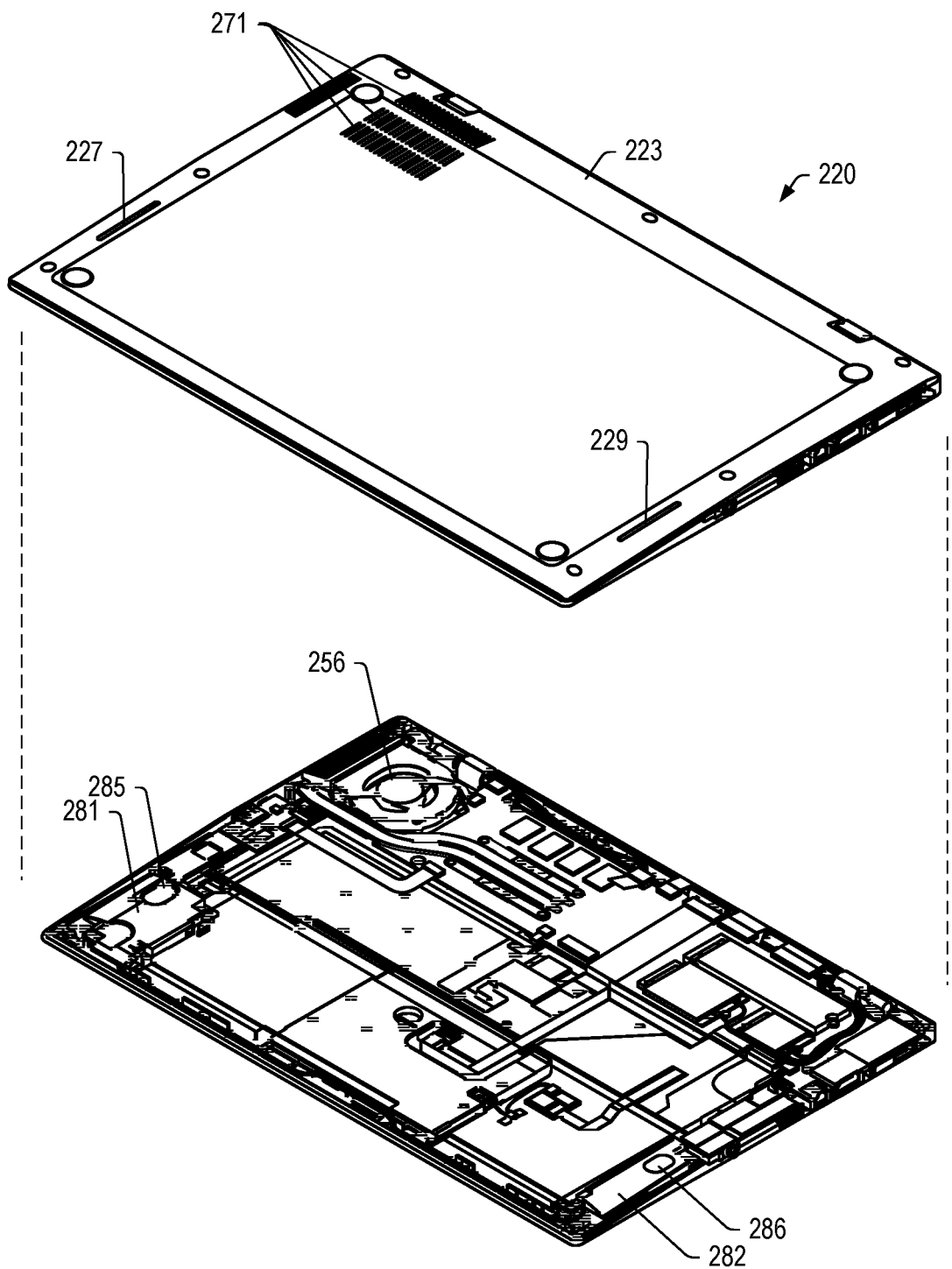
FIG. 4 is a diagram of the example of the device of FIG. 2.

FIG. 4 shows an exploded view of the keyboard housing 220, which shows the sub-enclosures 281 and 282 along with their corresponding speaker drivers 285 and 286, where the speaker driver 285 can be a first speaker driver and the speaker driver 286 can be a second speaker driver. As shown, the speaker drivers 385 and 286 face the openings 227 and 229, respectively.

FIG. 4 also shows the fan 256 with assorted fluid passages that can be utilized for movement of air to transfer heat energy. As shown in the example of FIG. 4, the lower assembly of the keyboard housing 223 includes various cooling vents 271, which are positioned proximate to the fan 256. In such an example, the fan 256 can include a fan motor that includes a shaft coupled to one or more fan blades where rotation of the shaft responsive to power supplied to the fan motor can move air. Depending on the direction of rotation of the shaft with respect to shape of the one or more blades, air may be moved into or out of various cooling vents 271. As an example, the various vents can include an inlet vent and an outlet vent. The fan 256 can act to create a pressure differential that results in an inlet at a low pressure and an outlet at a high pressure.

Figure 5:
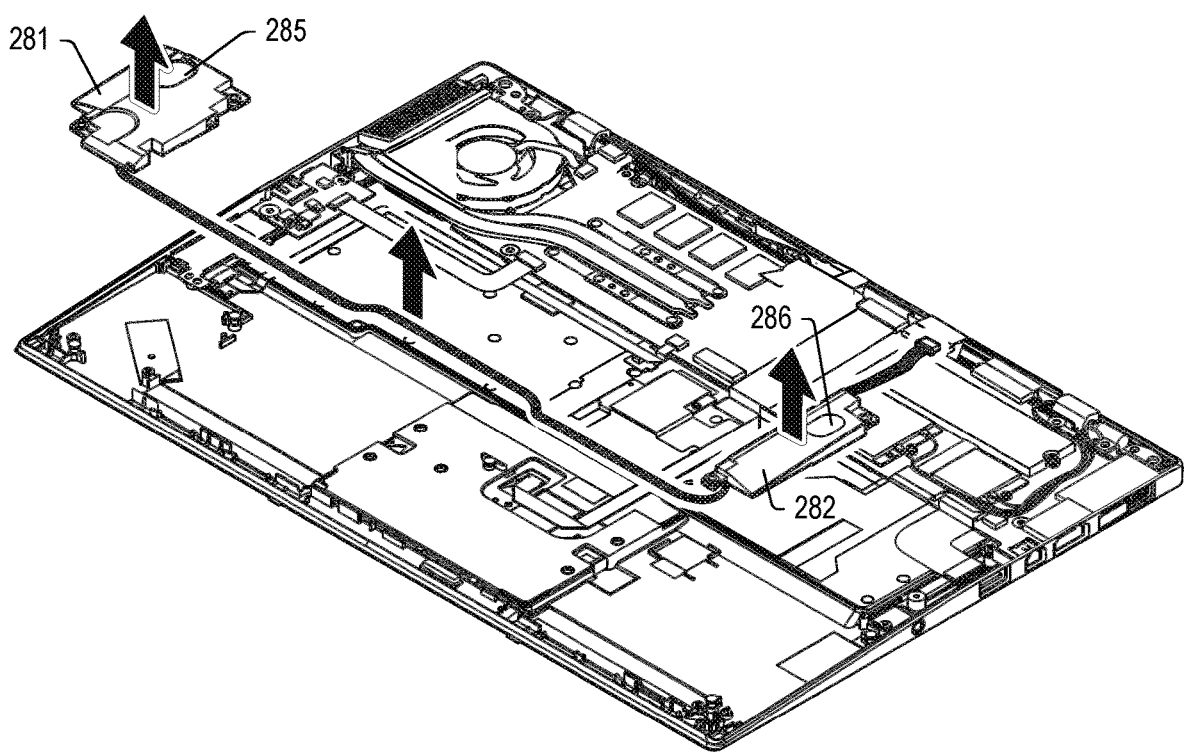
FIG. 5 is a diagram of a portion of the example of the device of FIG. 2.

FIG. 5 shows a partially dissembled view of the upper assembly of the keyboard housing 223 where the speaker assembly 280 is being removed. As indicated, the lithium ion battery 260 is removed prior to removal of the speaker assembly 280. The shape and size of the sub-enclosure 281 can be discerned from the various illustrations, which show that its shape and size differ from the shape and size of the sub-enclosure 282. Further, the sub-enclosures 281 and 282 are shown as including various mounting features such as tabs with apertures that can receive screws, bolts, etc., that are received by one or more other features such as a boss with a corresponding bore or bosses with corresponding bores, which may be threaded or unthreaded.

In engineering, a boss is a protruding feature on a work piece. A common use for a boss is to locate one object within a pocket or hole of another object. For example, some motors use a precisely machined boss on the front face to locate it on the mating part. One or more bosses may be cast or otherwise integrally formed on a piece to provide for corresponding attachment points.

In the example of FIG. 5, the sub-enclosures 281 and 282 have a double wedge shape where the small tip points of the wedges are toward the front and side, with larger portions being toward the back and inward from the sides. The wedge shape accounts for diminishing distance between the lower assembly of the keyboard housing 223 and the upper assembly of the keyboard housing 221 as the keyboard housing 220 tends to be thinner at the front than the back and slightly thinner at the sides than in the middle.

As mentioned, where one of the sub-enclosures 281 and 282 becomes loose, it may move, which may cause wear to one or more components such as, for example, the cable 283 and/or the connector 285, which extends via a cable from the sub-enclosure 282. Additionally, one of the speaker drivers 285 and 286 may become loose from its corresponding sub-enclosure 281 and 282. A loose speaker driver may fall into a sub-enclosure or fall out of a sub-enclosure. As the speaker driver may remain active, it may vibrate during sound production and/or movement of a device. As the sub-enclosure is positioned adjacent to various other components, a loose sub-enclosure and/or a loose speaker driver may cause damage to or inoperability of one or more components.

Figure 6:
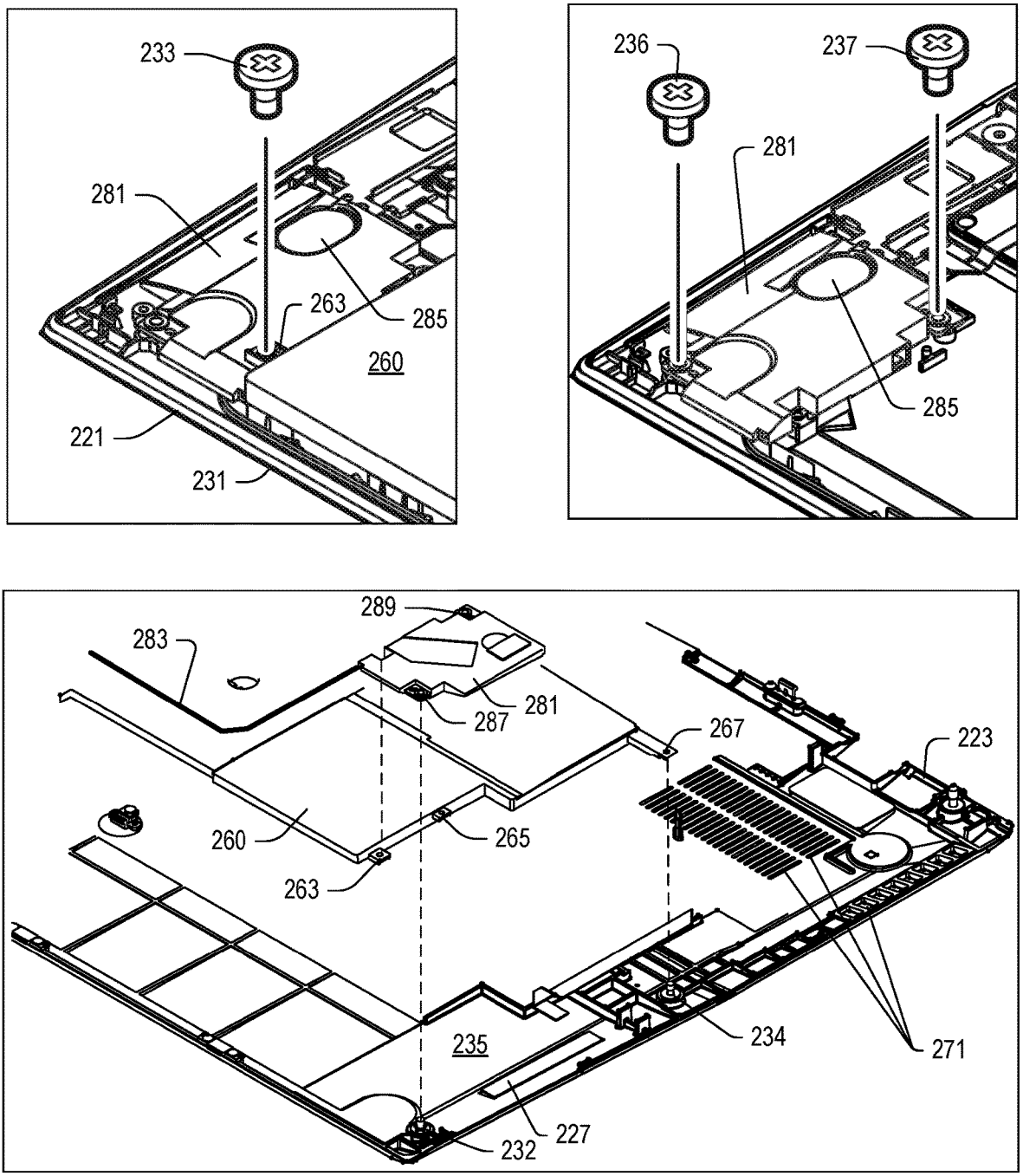
FIG. 6 is a series of diagrams of a portion of the example of the device of FIG. 2.

FIG. 6 shows three views of the device 200 including the sub-enclosure 281 as positioned in a cavity 235 that includes various features for securing the sub-enclosure 281. As shown, the lithium ion battery 260 includes tabs 263, 265 and 267 where the tab 263 receives a bolt 233 that passes through the tab 263 and into a threaded bore of the sub-enclosure 281. Further, the sub-enclosure 281 includes additional features 287 and 289 that cooperate with other features of the device 200. For example, the feature 287 is a tab that cooperates with a feature 232 of the lower assembly of the keyboard housing 223. As shown, a bolt 236 can pass through an aperture of the tab 236 and a bolt 237 can pass through an aperture of the tab 289. Also shown are features 267 and 234, which are a tab of the lithium ion battery 260 and a boss with a bolt of the lower assembly of the keyboard housing 223.

As to components associated with the sub-enclosure 281, these include the bolts 233, 236 and 237 along with corresponding bores to receive the bolts 233, 236 and 237. During assembly of the device 200, the three bolts must be provided, positioned and installed in a manner that properly secures the sub-enclosure 281. Similarly, the sub-enclosure 282 introduces additional components.

FIG. 6 also shows a track 231 that provides space for routing of the cable 283 of the speaker assembly 280, which is at the front of the keyboard housing 220.

In the example of FIG. 6, the sub-enclosures are shown as hard plastic boxes with a corresponding speaker driver and one or more ports. For example, in the view with the bolts 236 and 237, a port can be seen on a side of the sub-enclosure 281. As the hard plastic has a thickness, space is taken by the hard plastic itself, as well as any additional features that are attached to or molded into the hard plastic that are to be used to secure the sub-enclosure in a device.

During a design process, space may be identified in a device such as in a keyboard housing or other HID housing of a device. Once the space is identified, a sub-enclosure or sub-enclosures are designed from hard plastic where appropriate modifications are made to secure the sub-enclosure or sub-enclosures, which, as mentioned, can introduce additional parts and thereby increase total part count, which has an impact on manufacturing.

Figure 7:
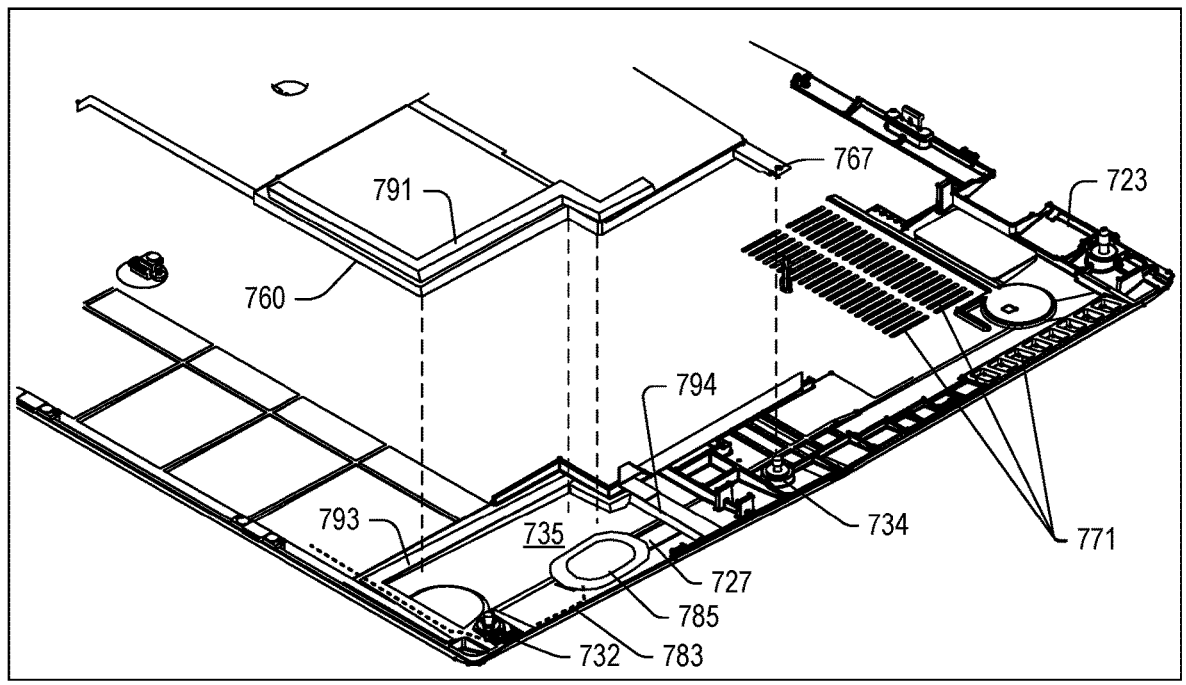
FIG. 7 is a diagram of a portion of an example of a device that includes an internal acoustic enclosure that defines an internal acoustic cavity.

FIG. 7 shows an example of an assembly that includes a lower assembly of a keyboard housing 723 of a device, an opening 727 (e.g., a speaker driver vent, etc.), an internal acoustic enclosure 735 (e.g., an internal acoustic cavity), a lithium ion battery 760, a speaker driver 785 in fluid communication with the internal acoustic enclosure 735, and a cable 783 operatively coupled to the speaker driver 785.

In the example of FIG. 7, air sealant material 791, 793 and 794 are shown, which may be shaped or sized as appropriate to provide for air tightness of the internal acoustic enclosure 735. For example, the air sealant material 791, 793 and 794 can include one or more of preformed material (e.g., a gasket, etc.) and formable material (e.g., a caulk, a putty, etc.). As an example, an air sealant material may be adhesive or include an adhesive portion. For example, consider a polymeric material with an adhesive layer that can be utilized to adhere the polymeric material to a surface. As an example, the air sealant material 791 may be a preformed gasket or a formable material that can be applied during assembly. As an example, an air sealant material may be reusable such that disassembly and reassembly may occur using the same air sealant material. As an example, upon reassembly, fresh (e.g., new) air sealant material may be utilized (e.g., applied at a proper stage of reassembly).

In the example of FIG. 7, where an upper assembly of the keyboard housing is joined to the lower assembly of the keyboard housing 723, the internal acoustic enclosure 735 is defined at least in part by a surface of the lower assembly of the keyboard housing 723 and may be defined in part by a surface of the lithium ion battery 760. As shown, air tight seals may be formed with respect to one or more surfaces of the lithium ion battery 760 such that acoustic waves produced by the speaker driver 785 are substantially retained in the internal acoustic enclosure 735 except for being directed outwardly via the opening 727. As an example, the lower assembly of the keyboard housing 723 can be a D-cover assembly that includes a D-cover, which can be a shell. In such an example, an upper assembly of the keyboard housing can be a C-cover assembly that includes a C-cover, which can be a shell.

In the example of FIG. 7, the speaker driver 785 can be adhered to the lower assembly of the keyboard housing 723. For example, an adhesive can be utilized, which may be, for example, formed on a portion of the speaker driver 785. As an example, consider a speaker driver with a peel off material that covers a diaphragm of the speaker driver and that covers adhesive. At the time of assembly, the material can be peeled off to expose the diaphragm and the adhesive where the adhesive can be utilized to adhere, securely, the speaker driver to a surface, which can include an opening, a vent, etc.

As an example, where an adhesive fails and a speaker driver becomes loose, it may be confined to the space defined by an internal acoustic enclosure, which can be air tight, for example, except for an opening (e.g., grille, vent, etc.). In such an example, even where a spill may occur or where it is raining, moisture that enters the opening may be isolated to the internal acoustic enclosure where the internal acoustic enclosure is made air tight using one or more air sealant materials that can withstand moisture (e.g., being wet with water, a beverage, etc.). As an example, an air tight internal acoustic enclosure with a separated speaker driver may be amenable to vacuuming where debris that may enter can be sucked out with a minimal to no risk of damaging one or more other components of a mobile computing device. In contrast, for the sub-enclosure 281 as in FIG. 6, applying suction to the opening 227 may result in sucking force being applied to a component that may become dislodged as there can be spaces between the sub-enclosure 281 and other components of the device 200.

As an example, the internal acoustic enclosure 735 may be a type of internal echo chamber of a mobile computing device. An echo chamber is a space with sound-reflecting walls that can be used for producing hollow or echoing sound effects.

As an example, the internal acoustic enclosure 735 may be a type of acoustic suspension enclosure. An acoustic suspension enclosure is completely sealed, including sealed by a diaphragm of a speaker driver. An acoustic suspension enclosure is designed to be completely sealed, so no air can escape. This means that a forward wave produced by a speaker driver travels outward, while a backward wave produced by the speaker driver travels only into the acoustic suspension enclosure. As no air is meant to escape, internal air pressure is constantly changing during operation such that, when the driver moves in, the pressure is increased and when the driver moves out, the pressure is decreased. Both types of movements create pressure differences between the air inside the acoustic suspension enclosure and the air outside the acoustic suspension enclosure. Air will move to equalize pressure levels, so the speaker driver tends to be being biased toward its resting state (e.g., an equilibrium state where internal and external air pressures are the same).

An acoustic suspension enclosure can be less efficient where an amplifier has to boost an electrical signal to overcome the force of air pressure. However, as explained, the force acts like a spring to keep the speaker driver diaphragm in a desired position, which can provide for tighter, more precise sound production.

Figure 8:
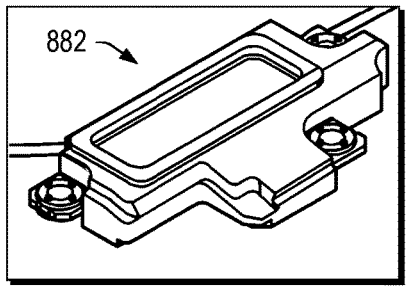
FIG. 8 is a series of diagrams of sub-enclosures.
Figure 8:
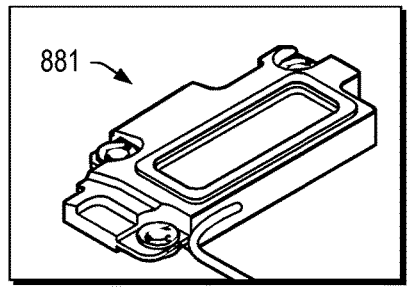
Figure 8:
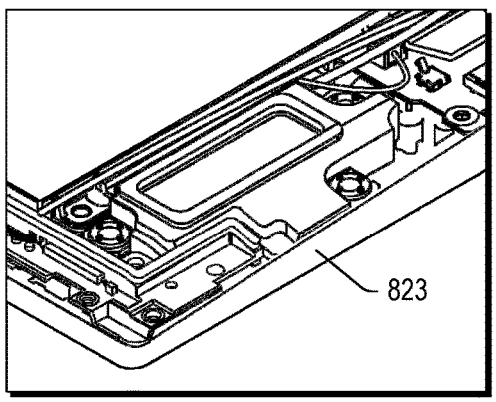
Figure 8:
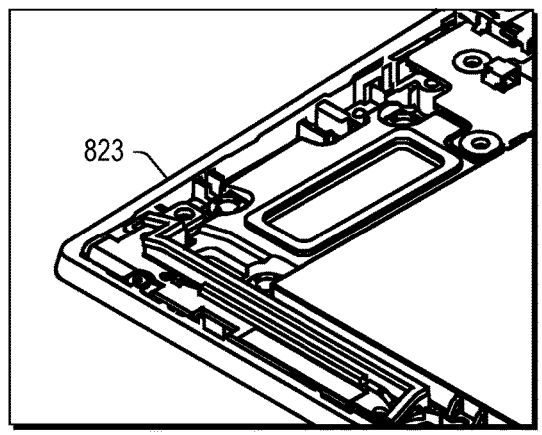
Figure 8:
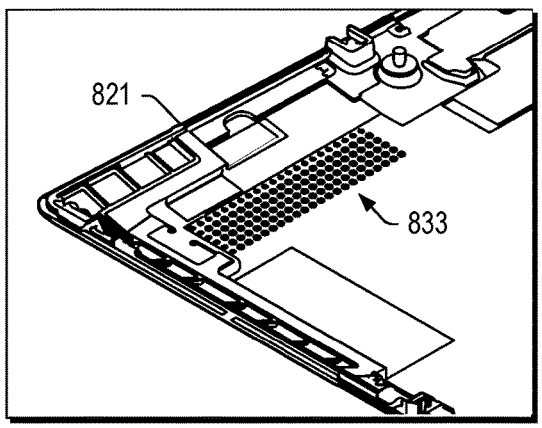
Figure 8:
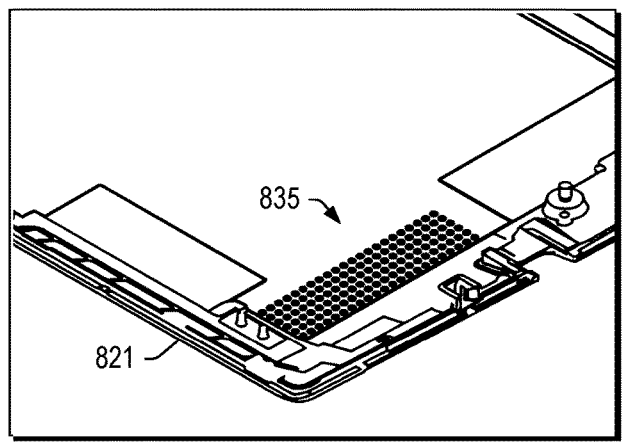

FIG. 8 shows examples of various components of a computing device that includes a right side speaker sub-enclosure 881 and a left side speaker sub-enclosure 882, which can be fit into a right side speaker bay 827 of a C-cover assembly 823 and a left side speaker bay 829 of the C-cover assembly 823. The sub-enclosures 881 and 882 can be covered by a D-cover assembly 821, which can include openings 833 and 835, respectively, that allow for movement of air therethrough as driven by respective drivers of the sub-enclosures 881 and 882. As shown, the openings 833 and 835 can be base side openings such that compression waves are directed downwardly (e.g., to a gap between a base side of the D-cover assembly 821 and a support surface).

As explained, use of sub-enclosures can increase part count, increase mass, increase assembly demands, decrease space utilization efficiency, etc. Space utilization efficiency can be characterized on the basis as to whether space is utilized for a particular purpose or not. For example, a sub-enclosure has a wall thickness, which is non-effective space as, while it can define a volume associated with sound production, it does not contribute to that volume. Further, fixtures that are required to secure the sub-enclosure similarly do not contribute to that volume.

Figure 9:
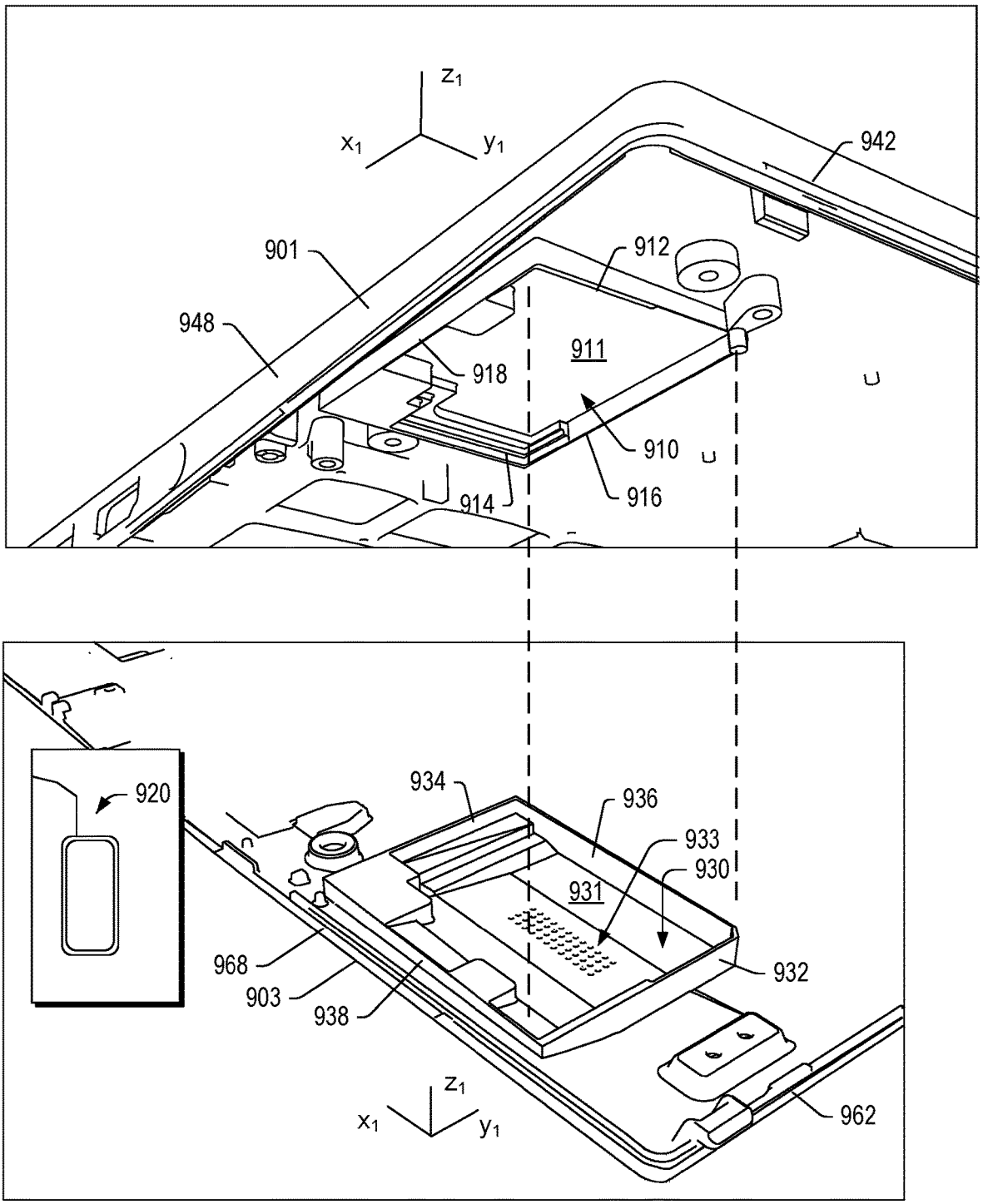
FIG. 9 is a series of diagrams of examples of covers that define an example of an internal acoustic cavity.

FIG. 9 shows an example of a C-cover 901 and a D-cover 903, which may be referred to as opposing shells 901 and 903 that mate to form a housing such as, for example, a keyboard housing of a clamshell computing device, where a driver 920 can, for example, be disposed in the keyboard housing and utilized for sound production (e.g., via audio circuitry, etc.).

In the example of FIG. 9, a coordinate system is shown, which may be utilized to describe features of the C-cover 901 and the D-cover 903. As shown in the example of FIG. 9, the C-cover 901 includes a cavity 910 that is defined by one or more walls 911, 912, 914, 916, and 918. As shown, the walls 912, 914, 916 and 918 are lateral walls while the wall 911 is a top side wall. As shown, the lateral walls 912, 914, 916 and 918 can extend away from the top side wall 911. In the example of FIG. 9, the cavity 910 can be defined as an open sided box, for example, with one open side. Such a "box" may include one or more notches, which can provide for routing of one or more wires, which can be, for example, driver wires that supply energy and/or signals to a driver such as the driver 920. As shown in the example of FIG. 9, the D-cover 903 includes a cavity 930 that is defined by one or more walls 931, 932, 934, 936, and 938. As shown, the walls 932, 934, 936 and 938 are lateral walls while the wall 931 is a bottom side wall. As shown, the lateral walls 932, 934, 936 and 938 can extend away from the bottom side wall 931. In the example of FIG. 9, the cavity 930 can be defined as an open sided box, for example, with one open side. Such a "box" may include one or more notches, which can provide for routing of one or more wires, which can be, for example, driver wires that supply energy and/or signals to a driver such as the driver 920.

In the example of FIG. 9, the C-cover 901 includes lips 942 and 948, which are disposed outwardly from the walls 912 and 918, respectively. In such an example, the cavity 910 is interior to the lips 942 and 948. For example, the cavity 910 can be defined as an interior cavity that is interior to lips of a C-cover, where the lips may be perimeter lips, perimeter edges, etc.

In the example of FIG. 9, the D-cover 903 includes lips 962 and 968, which are disposed outwardly from the walls 932 and 938, respectively. In such an example, the cavity 930 is interior to the lips 962 and 968. For example, the cavity 930 can be defined as an interior cavity that is interior to lips of a D-cover, where the lips may be perimeter lips, perimeter edges, etc.

As shown by dashed lines, pairs of lateral walls such as the lateral walls 912 and 932 can be aligned where, upon mating of the C-cover 901 and the D-cover 903, the two cavities 910 and 930 form a unified cavity where the unified cavity can be in fluid communication with a space that is exterior to the unified cavity via one or more openings 933, which are shown, for example, as the openings 933 in the bottom side wall 931 of the D-cover 903 (e.g., bottom shell openings). As an example, the C-cover 901 may include one or more openings (e.g., top shell openings), alternatively or in addition to one or more openings of the D-cover 903.

In the example of FIG. 9, a mobile computing device can include a housing that includes the D-cover 903 as a bottom shell, the C-cover 901 as a top shell and at least one shell opening such as, for example, the openings 933. Such a mobile computing device can include a processor disposed in the housing; memory accessible to the processor and disposed in the housing; audio circuitry disposed in the housing and operatively coupled to the processor; a human interface unit mounted to the housing, operatively coupled to the processor and accessible via the top shell of the housing; and a speaker driver (e.g., the driver 920) mounted to the housing and operatively coupled to the audio circuitry, where the speaker driver is in fluid communication with the at least one shell opening (e.g., the openings 933). In the example of FIG. 9, the unified cavity as formed by the cavities 910 and 930 can be an internal acoustic cavity (e.g., an internal acoustic enclosure) defined by at least one of the D-cover 903 (e.g., bottom shell) and the C-cover 901 (e.g., top shell), where the internal acoustic cavity is in fluid communication with the speaker driver, for example, the driver 920 as mounted to the housing. In such an example, the driver 920 may be mounted via one or more techniques, technologies, etc. For example, consider one or more of adhesive and mechanical mounting. As to mechanical mounting, consider a clip that can clip the driver 920 to the D-cover 903, clamping a portion of the driver 920 between the D-cover 903 and the C-cover 901, etc. As shown, the cavities 910 and 930 can form an internal acoustic cavity that is defined by the D-cover 903 (e.g., bottom shell) and the C-cover 901 (e.g., top shell). In such an example, the internal acoustic cavity can span an open distance (e.g., a component free distance) from an inner surface of the D-cover 903 to an inner surface of the C-cover 901. As shown in the example of FIG. 9, the cavities 910 and 930 are disposed along the $x_1$ dimension between a keyboard and an edge. In such an example, the cavities 910 and 930 may be in a region that corresponds to a palm rest region of a keyboard housing. As shown, the cavities 910 and 930 are disposed proximate to a side edge of a housing, for example, a side edge defined by the lips 948 and 968; noting that corresponding cavities may be included, for example, proximate to an opposing side edge.

As an example, the C-cover 901 can be formed of a material or materials and the D-cover 903 can be formed of a material or materials. As an example, the materials of the C-cover 901 and of the D-cover 903 can be the same or different or, for example, may include one or more materials that are the same and one or more materials that are different.

As an example, the lateral walls 912, 914, 916 and 918 can be integral to the top side wall 911. For example, consider use of a material such as a polymeric material that is utilized to form the walls 911, 912, 914, 916 and 918 such that polymeric bonds between monomers exist between the lateral walls 912, 914, 916 and 918 and the top side wall 911. As an example, one or more of molding, additive manufacturing and machining may be utilized to form one or more of the walls 911, 912, 914, 916 and 918. As an example, the C-cover 901 can include a skin. For example, consider a metallic or other types of skin fit to a polymeric insert where the polymeric insert includes at least the walls 912, 914, 916 and 918. In such an example, the wall 911 may be part of the polymeric insert and/or part of the skin. As an example, one or more of the walls 912, 914, 916 and 918 may be formed via a stamping process. For example, consider stamping of a piece of material where the material is bent to form one or more of the walls 912, 914, 916 and 918. In such an example, the C-cover 901 can be an assembly that includes a stamped insert and a skin where the skin can include at least a portion of the top side wall 911.

As an example, the lateral walls 932, 934, 936 and 938 can be integral to the bottom side wall 931. For example, consider use of a material such as a polymeric material that is utilized to form the walls 931, 932, 934, 936 and 938 such that polymeric bonds between monomers exist between the lateral walls 932, 934, 936 and 938 and the bottom side wall 931. As an example, one or more of molding, additive manufacturing and machining may be utilized to form one or more of the walls 931, 932, 934, 936 and 938. As an example, the D-cover 903 can include a skin. For example, consider a metallic or other types of skin fit to a polymeric insert where the polymeric insert includes at least the walls 932, 934, 936 and 938. In such an example, the wall 931 may be part of the polymeric insert and/or part of the skin. As an example, one or more of the walls 932, 934, 936 and 938 may be formed via a stamping process. For example, consider stamping of a piece of material where the material is bent to form one or more of the walls 932, 934, 936 and 938. In such an example, the D-cover 903 can be an assembly that includes a stamped insert and a skin where the skin can include at least a portion of the bottom side wall 931.

While FIG. 9 shows one or more lateral walls as part of a C-cover (or shell) and one or more laterals walls as part of a D-cover (or shell), as an example, a housing may be formed of a C-cover with one or more laterals walls and a D-cover without one or more lateral walls where a cavity is formed by mating of the C-cover and the D-cover. As an example, a housing may be formed of a D-cover with one or more laterals walls and a C-cover without one or more lateral walls where a cavity is formed by mating of the D-cover and the C-cover.

As an example, the driver 920 can be a relatively thin component that can be disposed at least in part in a unified cavity where compression waves generated by the driver 920 can travel through the openings 933. As an example, the driver 920 may be secured using an adhesive and/or via clamping. For example, consider clamping via mating of the D-cover 901 and the C-cover 903. As mentioned, one or more notches can be provided such that one or more wires can extend from the driver 920 to appropriate audio circuitry, which can be exterior to the unified cavity.

As mentioned, a housing can include one or more gaskets that can define and/or seal a portion of a cavity. As mentioned, a housing can include one or more components that can define and/or seal a portion of a cavity. For example, consider a battery such as a lithium-ion battery, which may be a flexible pouch style battery.

As mentioned, one or more types of coatings may be utilized for acoustic purposes. For example, one or more of the walls of the C-cover 901 and/or the D-cover 903 may be coated with a coating or coatings that provide desirable acoustic properties (e.g., damping, reflection, transmission, etc.).

Figure 10:
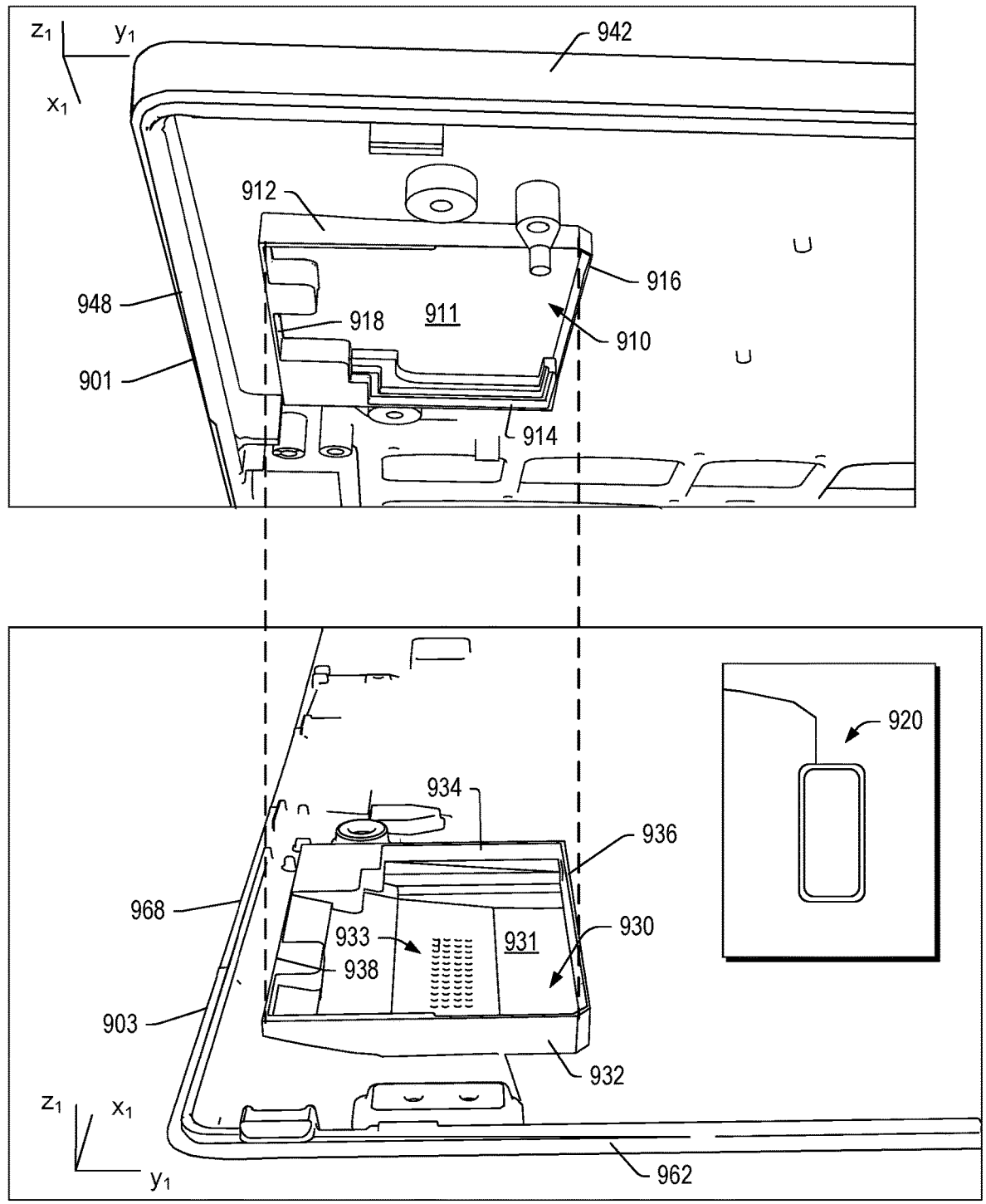
FIG. 10 is a series of diagrams of examples of covers that define an example of an internal acoustic cavity.

FIG. 10 shows another view of the C-cover 901 and the D-cover 903 of FIG. 9 where dashed lines indicate how lateral walls may be aligned such that mating of the C-cover 901 and the D-cover 903 can form a unified cavity from the cavities 910 and 930.

Figure 11:
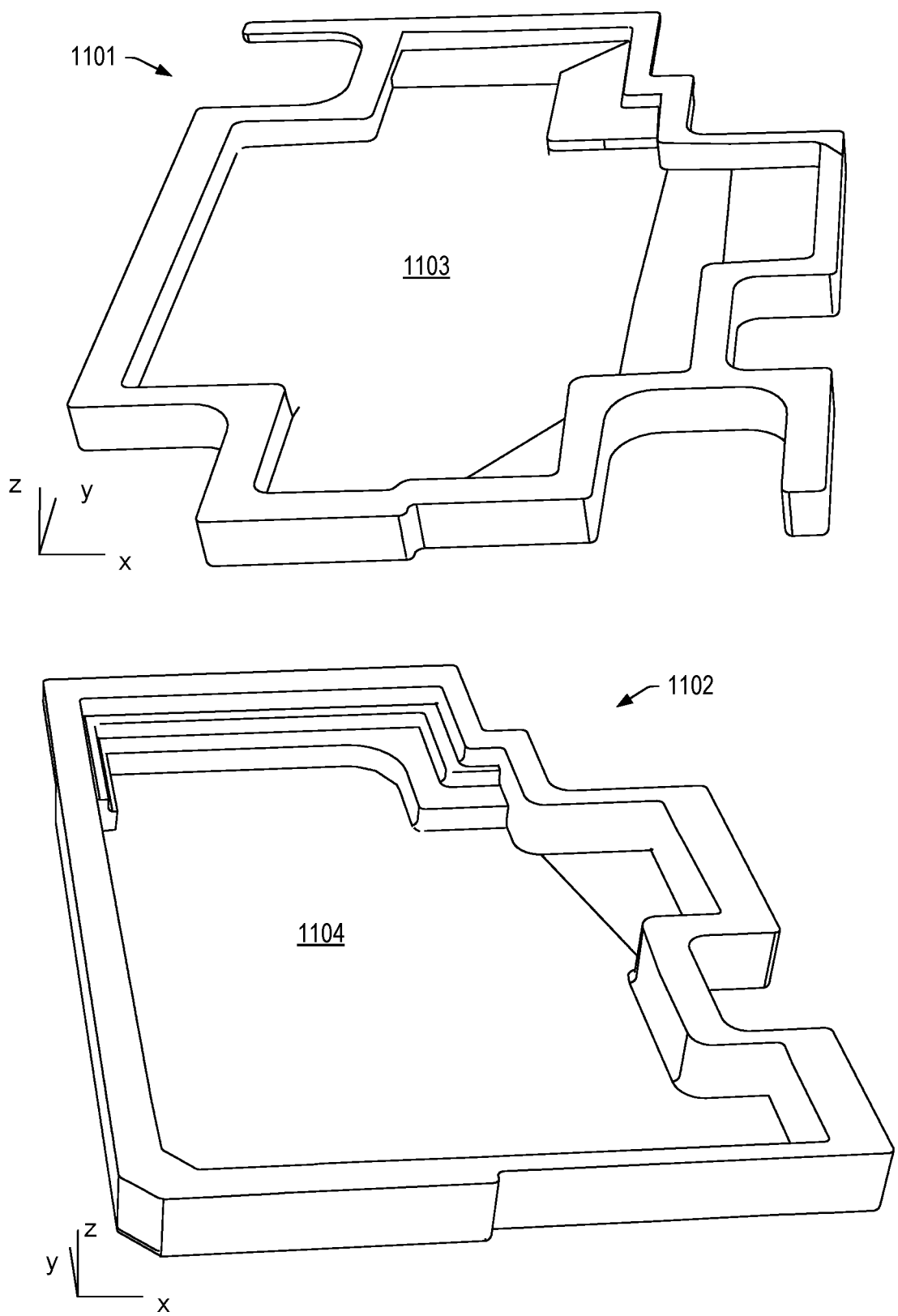
FIG. 11 is a series of diagrams of a sub-enclosure cavity and an example of an internal acoustic cavity.

FIG. 11 shows a perimeter wall 1101 of a sub-enclosure that defines a cavity 1103 and a perimeter wall 1102 of a housing that defines a cavity 1104 where the cavity 1104 is larger than the cavity 1103. Specifically, the cavity 1104 has a larger volume than the cavity 1103. The perimeter wall 1101 of the sub-enclosure includes features to accommodate securing the sub-enclosure in a space while the perimeter wall 1102 of the housing makes more optimal use of that space. Specifically, the perimeter wall 1102 of the housing is more space efficient than use of the sub-enclosure. The examples of FIG. 11 are suitable for a keyboard housing of a computing device where computing components and a battery to power those computing components can be of the same type, number, etc. For example, a difference can be in speakers where the housing-based approach is more space efficient that the sub-enclosure approach. As mentioned, the housing-based approach (e.g., integral cavity approach, etc.), can reduce part count, reduce assembly steps, reduce assembly line demands, etc.

Figure 12:
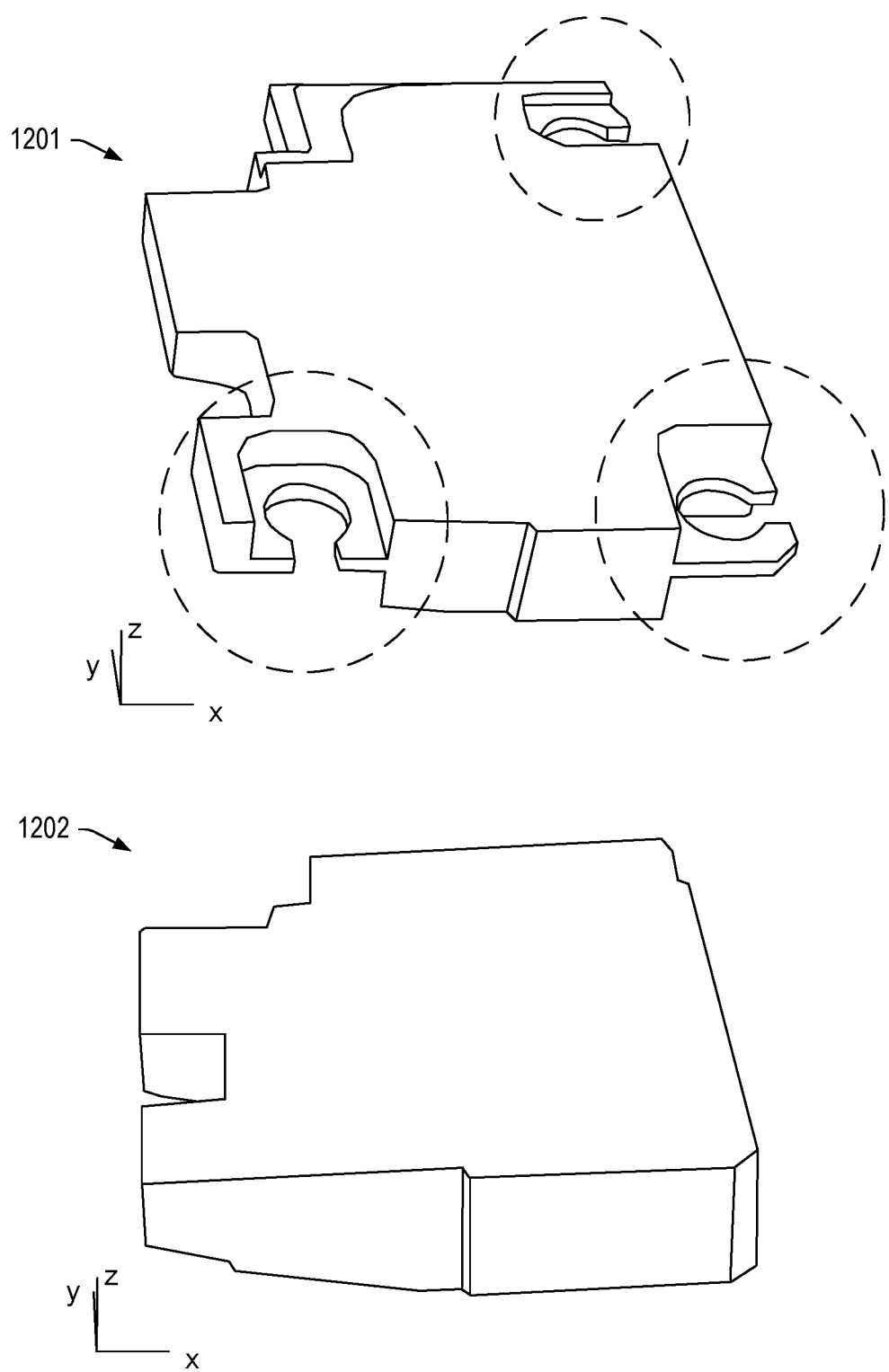
FIG. 12 is a series of diagrams of a sub-enclosure and an example of an internal acoustic cavity.

FIG. 12 shows a perspective view of a sub-enclosure 1201 and a cavity 1202 that is defined by a C-cover and a D-cover of a keyboard housing of a clamshell computing device. In FIG. 12, dashed line circles indicate features of the sub-enclosure 1201 that contribute to space inefficiency. The features are for securing the sub-enclosure 1201 within a housing as a separate component in a space that fits the sub-enclosure 1201. The thickness of the walls of the sub-enclosure 1201 and features must be sufficient for integrity of the sub-enclosure 1201 during handling, shipping, installation, securing view bolts, screws, etc. The cavity 1202 is free of those features and can occupy a greater volume in the keyboard housing of the clamshell computing device. As mentioned, a larger volume can enhance sound, particularly lower frequency sound (e.g., bass).

Figure 13:
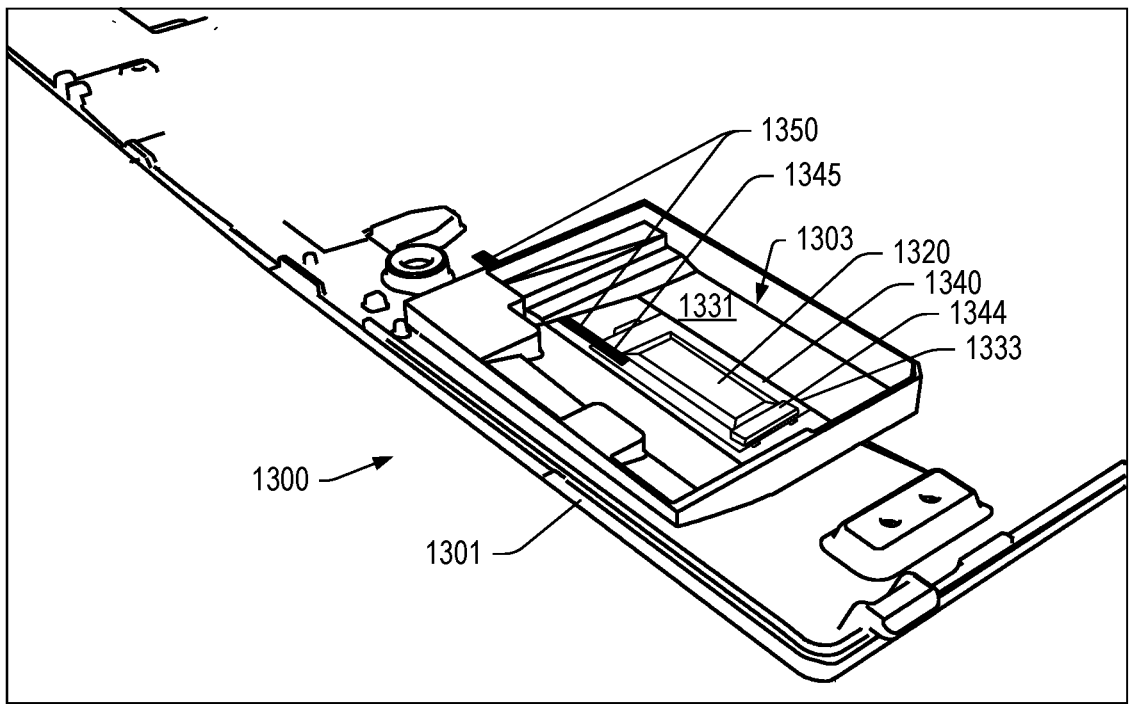
FIG. 13 is a series of diagrams of an example of an internal acoustic cavity and a speaker assembly.
Figure 13:
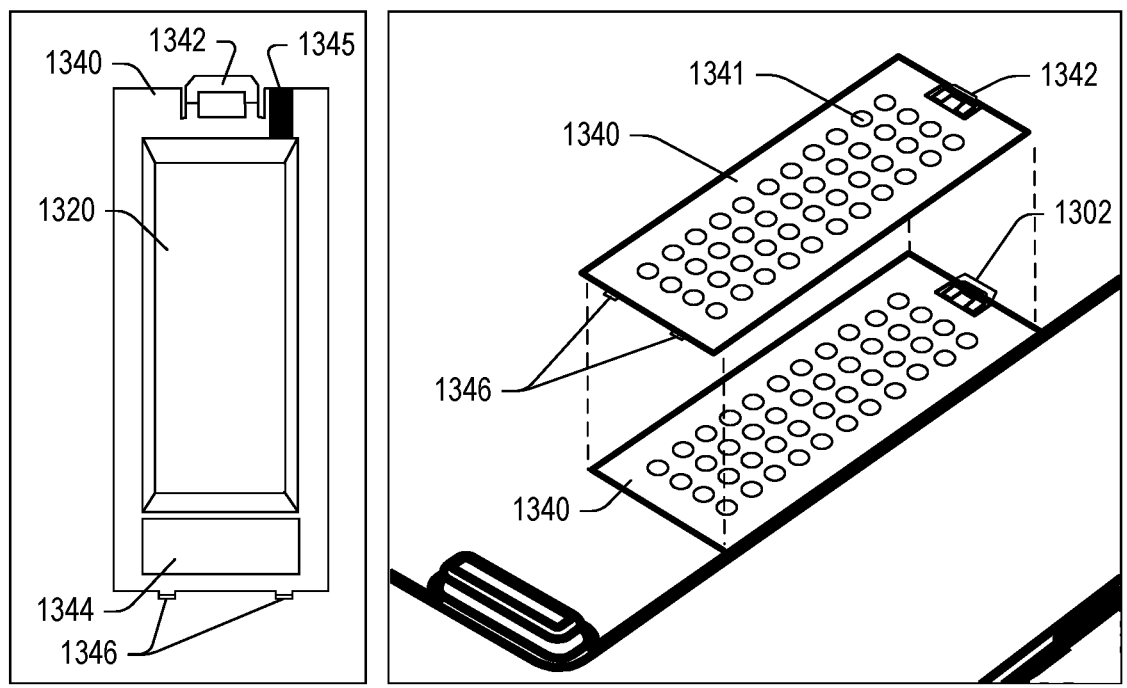

FIG. 13 shows an example of an assembly 1300 that includes a cover 1301 of a computing device, which may be a D-cover of a keyboard housing of a clamshell computing device or, for example, a cover of another type of computing device. As shown, the cover 1301 includes a cavity 1303 formed by various walls including a wall 1331 that includes an opening 1333 that is in receipt of a speaker assembly 1340 where the speaker assembly includes a driver 1320, which can be aligned with one or more vents (e.g., openings, etc.) 1341 such that the driver 1320 upon receipt of electrical power and audio signals can move air to generate sound. In the example of FIG. 13, the speaker assembly 1340 may be a hatch that forms at least a portion of an internal acoustic cavity. As an example, a hatch may be a top hatch (e.g., accessible via a top shell) or a bottom hatch (e.g., accessible via a bottom shell, etc.).

As an example, the cavity 1303 can be enclosed and may be substantially air-tight such that the cavity 1303 operates as an internal acoustic cavity (e.g., a speaker box, etc.). In such an example, the speaker assembly 1340 can be a hatch to an internal acoustic cavity. As an example, the cavity 1303 or an internal acoustic cavity formed at least in part thereby may include one or more ports.

As an example, the cavity 1303 may become a closed internal acoustic suspension enclosure (e.g., a closed internal acoustic suspension cavity) when the cover 1301 is fit with another component or components of a computing device (e.g., consider a C-cover, a display, etc.). In a closed internal acoustic suspension enclosure, backward waves generated by a driver can be encapsulated in the enclosure as it can be a sealed speaker box enclosure. In such an example, air pressure in the enclosure changes responsive to action of the driver. For example, when the driver moves inwardly, pressure increases; conversely, pressure decreases as the driver moves outwardly. While a sealed enclosures may be in some instances less efficient than some other designs (e.g., because an amplifier may have to increase electrical signal power to handle the air pressure), the force generated by the air pressure can help to maintain the driver's position such that sound produced is tighter and more precise.

In the example of FIG. 13, the speaker assembly 1340 can include a tab 1342 and may include an electrical connector 1345 or, for example, electrical connectors. As shown, the tab 1342 can be utilized to removably secure the speaker assembly 1340 to the cover 1301 (e.g., consider a resilient tab that may be formed integrally with a portion of the speaker assembly 1340 such as a hatch wall portion). As an example, the speaker assembly 1340 can include one or more other features 1346, which may be tabs. For example, the tab 1342 may be resilient while the one or more features 1346 are less resilient or rigid (e.g., less resilient or rigid tabs). As an example, the speaker assembly 1340 may pivot into place. For example, consider slotting the one or more features 1346 at one end into one or more corresponding positions of the cover 1301 and then pivoting the tab 1342 at an opposing end into a corresponding position of the cover 1301, which may include a receptacle 1302 for the tab 1342 (e.g., consider a battery cover type of securing mechanism such as, for example, that of the battery cover of the GAME BOY POCKET device, the GAME BOY CLASSIC device, etc. (Nintendo Co., Ltd., Kyoto, Japan)). As an example, one or more features that act to secure a speaker assembly in an opening of a cover may include one or more electrical connectors (e.g., to provide one or more of power and signals to circuitry, which can include driver circuitry).

In an example such as the example of FIG. 13, if one or more components of the speaker assembly 1340 are to be serviced, replaced, upgraded, etc., a user or a service provider may utilize the tab 1342 to remove the speaker assembly 1340 from the cover 1301. For example, consider a process that involves replacement of the driver 1320. In such an example, a user may remove the speaker assembly 1340, peel-off or otherwise remove the driver 1320 and install another driver. As mentioned, a driver may include an adhesive material that can be utilized to secure it to a cover or, for example, a speaker assembly such as the speaker assembly 1340. In such an example, the driver 1320 (e.g., or a replacement driver) can be operatively coupled to the electrical connector 1345, which can electrically connect to one or more connectors of the assembly 1300 such as, for example, the electrical connector 1350, which may provide one or more of power, audio signals, other signals, etc. As an example, a speaker assembly can include snap features such that, for example, a driver 1320 can be snapped into place. For example, consider prongs where the prongs can be biased by forcibly inserting a driver such that an interference fit is achieved to securely hold the driver in position. In various examples, the speaker assembly 1340 can be screw-free, bolt-free and/or boss-free (e.g., where a boss is utilized to provide a bore that can receive a screw, a bolt, etc.). As mentioned, in internal speaker cavity can be boss free. As mentioned, features may be minimal as to space such that space of an internal speaker cavity can be maximized (e.g., for purposes of sound).

As an example, the circuitry 1344 can include digital signal processing (DSP) circuitry, which may process analog signals and/or digital signals (e.g., consider audio to digital conversion, etc.). As an example, a DSP may control a driver such as the driver 1320. As an example, the circuitry 1344 can include one or more rechargeable batteries. In such an example, the speaker assembly 1340 may be operable using a supplied audio signal from one or more sources. For example, the circuitry 1344 can include wireless circuitry (e.g., WIFI, BLUETOOTH, etc.) such that the speaker assembly 1340 can operate optionally when a computing device (e.g., including the cover 1301, etc.) is powered off. In such an example, the speaker assembly 1340 can be a wireless speaker assembly that can receive audio signals wirelessly and generate sound using its own battery power. As an example, the speaker assembly 1340 may include a power connection to an internal battery or other power circuitry of a computing device where circuitry of the speaker assembly 1340 may be configured to receive audio signals via wireless transmission.

As explained, an internal acoustic cavity of a computing device that is at least in part integral to at least one shell can be in fluid communication with a driver (e.g., a speaker driver). Such an internal acoustic cavity can include a wall with one or more vents (e.g., one or more openings), which may be utilized to allow for fluid movement driven by a speaker driver. As shown in the example of FIG. 9 and FIG. 10, an internal acoustic cavity can include openings and, as shown in the example of FIG. 13, an internal acoustic cavity can include an opening that can receive a speaker assembly that can include one or more vents (e.g., one or more openings). In various examples, a speaker driver may be a part that is serviceable upon decoupling a computing device cover (e.g., shell) such as a D-cover, a C-cover, etc., from one or more other components. In various examples, a speaker driver may be a part that is serviceable upon at least in part decoupling a hatch, which may be a speaker assembly hatch. For example, in FIG. 13, the cavity 1303 can include the opening 1333 as a hatch opening where the speaker assembly 1340 is a hatch that fits the hatch opening to form an appropriate internal acoustic cavity for the driver 1320. As an example, a computing device can include one or more internal acoustic cavities where each internal acoustic cavity can be associated with one or more drivers (e.g., one or more speaker drivers).

As an example, an internal acoustic cavity can be free of non-audio circuitry. For example, an internal acoustic cavity can include circuitry that is dedicated to audio (e.g., sound generation) while being free of other circuitry. In a computing device, an internal acoustic cavity can be a dedicated cavity that is dedicated to audio (e.g., sound generation). In such an example, the internal acoustic cavity can be relatively free of parts that may generate vibrations, become loose, rattle, etc. As explained, an internal acoustic cavity can be isolated in that it can be a volume that is an isolated volume within a computing device where components of the computing device that are not dedicated to sound generation are not present in that isolated volume. As an example, an internal acoustic cavity can be substantially air-tight. As an example, an internal acoustic cavity can be hermetically sealed. For example, an internal acoustic cavity of a computing device can be a hermetically sealed cavity where a driver (e.g., a diaphragm of a speaker, etc.) may act as a barrier between the hermetically sealed cavity and an exterior space of the computing device.

As an example, an internal acoustic cavity can include one or more ports which may be one or more vents that act to enhance sound. As an example, an internal acoustic cavity can include one or more ports and one or more plugs, which can be utilized to seal one or more of the one or more ports. For example, consider a foam plug that can be disposed in a port to seal the port. As an example, a user may be provided with an option to remove the foam plug or to maintain the foam plug. As an example, a user may aim to upgrade a driver and remove a plug from a port (e.g., to form an operable port) to enhance sound of a computing device. For example, consider a hatch that provides for a driver upgrade and access to a plug in a wall of an internal acoustic cavity (see, e.g., the wall 1331, etc.). In such an example, the user can remove the plug from the wall to provide an operable port, which may be suitable to enhance sound using the upgraded driver.

As shown in various examples, an internal acoustic cavity has a volume that is greater than that of a driver (e.g., a speaker driver). For example, an internal acoustic cavity can have a volume that is more than double the volume of a driver or, for example, more than triple that of a driver or, for example, more than four times that of a driver. In the example of FIG. 13, the cavity 1303 can be, for example, more than six times that of the driver 1320. As an example, an internal acoustic cavity can have an empty volume and a driver-assembled volume, where the empty volume may be reduced at least in part upon assembly with a driver or drivers.

As explained, mobile computing devices are designed for computing functionalities, which can include telephony (e.g., consider a smartphone, a table with a SIM card, a laptop with a SIM card, etc.). A mobile computing device can include circuitry such as digital communication circuitry. A mobile computing device can include circuitry such as audio circuitry and/or video circuitry. A mobile computing device can include circuitry for audio rendering of audio data, which may be stored locally (e.g., a drive or memory of the mobile computing device) or streamed from a remote storage location (e.g., via one or more interfaces). As an example, a mobile computing device may be configured with one or more processors, memory, etc., for gaming (e.g., rendering and interacting with "video" games) where a user expects high quality sound production, for example, to enhance realism, etc. (e.g., to make a gaming experience more "real" to the user). As an example, a mobile computing device may include an application that provides for rendering of music via audio rendering circuitry of the mobile computing device.

A mobile computing device can include one or more on-board speakers, which may be referred to as an internal speaker or internal speakers. Mobile computing devices can be more "mobile" when they are physically smaller, in dimensions and/or mass. While a speaker may be desirable or necessary for various functions of a mobile computing device, tradeoffs exists between various factors such as cost, size, mass, number, placement, etc.

In mobile computing devices such as, for example, a laptop, a speaker assembly can include a driver mounted to a sub-enclosure where the laptop has a cavity and where the sub-enclosure is designed to be physically secured in the cavity. For example, a laptop can include a case that includes one or more bosses with threaded bores where a sub-enclosure can include apertures that receive screws with threads that match those of the threaded bores such that screws can be utilized to physically secure the sub-enclosure in the cavity of the laptop. As another example, a laptop may include one or more bosses with bores that are not threaded where screws may be used to tap-into the material of a boss. In such examples, the case of the laptop must be formed to include various features to accommodate and to secure the speaker assembly sub-enclosure.

A speaker functions by transforming signals into sounds. In physics, sound is a vibration that typically propagates as an audible wave of pressure, through a transmission medium such as a gas, liquid or solid.

In human physiology and psychology, sound is the reception of such waves and their perception by the brain. Humans can tend to hear sound waves as distinct pitches when the frequency lies between approximately 20 Hz and approximately 20 kHz; noting that sound waves below 20 Hz may be referred to as infrasound.

Sound may be transmitted through gas, plasma, and liquid as longitudinal waves, also called compression waves. Through solids, however, sound may be transmitted as both longitudinal waves and transverse waves. Longitudinal sound waves are waves of alternating pressure deviations from the equilibrium pressure, causing local regions of compression and rarefaction, while transverse waves (in solids) are waves of alternating shear stress at right angle to the direction of propagation.

For increased low frequency response, a speaker can benefit from an as large as possible resonance cavity. As mentioned, a laptop speaker assembly can include a sub-enclosure that defines a speaker's resonance cavity.

In super-thin laptops, internal space is at a premium; where, for example, the volume of a sub-enclosure of a speaker assembly may be approximately 1 cubic centimeter to 2 cubic centimeters or more. Where a laptop includes two sub-enclosures, the volume may be from approximately 2 cubic centimeters to 4 cubic centimeters or more. For comparison, an IPHONE SE smartphone has exterior dimensions of 12.4 cm×5.9 cm×0.8 cm, which equates to a total volume of 58 $cm^3$ and the LENOVO THINKPAD X1 CARBON laptop has exterior dimensions of 33 cm×23 cm×1.8 cm, which equates to a total volume of 1,366.2 $cm^3$; noting that the keyboard housing is a fraction of the total volume (e.g., approximately 0.7 or 70 percent). Components of a clamshell laptop are disposed in a keyboard housing and in a display housing. Components disposed in a keyboard housing include a keyboard assembly (e.g., backlit keyboard with keyboard bezel and trackpad) and can include, for example, a micro-SIM-card-tray bracket, a micro-SIM-card tray, a system board assembly, a thermal fan, a RJ45 card with USB connector, a fingerprint reader assembly, a battery, one or more speaker assemblies, a wireless WAN card, a wireless LAN card, an audio card with USB connector, a M.2 solid-state drive, a dc-in bracket, a coin-cell battery, and an Ethernet extension adapter. As to components disposed in a display housing, consider an LCD unit, an LED unit, digitizer circuitry, touch circuitry, etc.

As to components that occupy a substantial amount of space, consider a keyboard assembly, a system board assembly (e.g., motherboard assembly) and a battery (e.g., a rechargeable lithium ion battery). Of those components, the keyboard assembly can be limited by constraints as to the size of human hands, the system board assembly can be limited by constraints as to processor and memory proximity and associated performance (e.g., heat energy, proximity, etc.), and the batter can be limited by constraints such as power density. As demand is increasing for more powerful laptops that are ergonomic yet light and small, space for one or more speaker assemblies can be limited. Ultimately, tradeoffs are made between one or more computing performance factors (e.g., size, mass, computing power, speed, memory, cooling, etc.) and sound production.

While 4 cm$^3$ of speaker assembly volume of a total of 1,000 cm$^3$ keyboard housing volume may be less than one percent, speaker assembly cavity volume and other features associated with securing a sub-enclosure of a speaker assembly can be taken into account as increasing the volume demand of a sub-enclosure-based speaker assembly for sound production.

As an example, a mobile computing device can include an on-board speaker that is mounted in a housing such that the on-board speaker is in fluid communication with an internal acoustic enclosure of the housing (e.g., where movement of a diaphragm of the on-board speaker changes pressure in the internal acoustic enclosure. In such an example, the housing can include a vent where the on-board speaker is in fluid communication with an external environment, external to the housing, via the vent. In such an example, the vent may be an opening that includes a grille or that does not include a grille. Where the vent does not include a grille, a grille may be utilized, for example, to physically protect a driver (e.g., a diaphragm) of the on-board speaker.

As an example, a housing may be bossless with respect to an on-board speaker or, for example, a housing may include one or more bosses that are utilized to mount the on-board speaker to the housing. As an example, a housing of a mobile computing device can include an internal acoustic enclosure (e.g., or internal acoustic enclosures) that is (are) at least in part integrally formed with the housing. In such an example, the internal acoustic enclosure may be formed in part by one or more components of the mobile computing device. For example, consider an internal acoustic enclosure that is formed at least in part by a wall of a rechargeable lithium ion battery, which may be a flexible wall (e.g., a polymeric wall of a pouch style lithium ion battery). As an example, an internal acoustic enclosure can be, internally, air tight, for example, via use of a gasket, gaskets, a sealant, sealants, etc. For example, consider a polymeric gasket that can be pressed between two surfaces to form an air tight seal. As another example, consider an acoustic sealant (e.g., an acoustic caulk) that can be delivered to a surface, to surfaces, an interface, etc., to form an air tight seal. For example, consider a siliconized acrylic sealant (e.g., siliconized acrylic latex, etc.).

As an example, an internal acoustic enclosure may be coated using one or more types of materials. For example, consider an acoustic paint, which can include one or more additives that provide desirable sound properties. As an example, an internal acoustic enclosure may be coated and/or sealed using one or more types of materials. For example, consider a latex material that can seal one or more small gaps to provide for air tightness and that can coat surfaces to provide desirable sound properties.

As an example, an internal acoustic enclosure may be adjacent to a flexible lithium ion battery where expansion or contraction of the flexible lithium ion battery causes a corresponding increase or decrease in volume of the internal enclosure. In such an example, the internal acoustic enclosure can be a dual purpose internal enclosure in that it can be an expansion space for the flexible lithium ion battery, which may help to prevent risk of rupture of the flexible lithium ion battery and/or deformation of a housing of a mobile computing device. While such an approach may result in some differences in sound production depending on battery volume, an indication of a change in sound production may be an indicator of an expanded battery volume (e.g., or a contracted battery volume) that may be detrimental. For example, an expanded battery volume may reduce low frequency response in a detectable manner by reducing volume of an internal acoustic enclosure where the expanded battery volume may be indicative of an internal failure of the battery. As to a decrease in volume, a punctured flexible lithium ion battery may leak and thereby reduce in volume. In such an example, an internal acoustic enclosure that was air tight may become leaky to air upon a decrease in volume of the flexible lithium ion battery and thereby have a change in sound production (e.g., lack of resonant character, lack of "stiffness", etc.). Where an internal acoustic enclosure includes a passive radiator, an air leak to the internal acoustic enclosure may impact the performance of the passive radiator, detrimentally.

As an example, an internal acoustic enclosure may be selectively in fluid communication with one or more heat transfer passages. For example, consider an internal acoustic enclosure that includes a valve, which may be a spring-loaded flap. In such an example, where a fan increases speed, pressure may increase to cause the valve to open and allow for air to flow into the internal acoustic enclosure and, for example, out of a vent or vents. In such an example, the valve may be a unidirectional flow valve where sound pressure driven by a speaker creates pressure that biases the unidirectional flow valve in a closed position; whereas, pressure of a fan biases the unidirectional flow valve in an opposite direction to an open position. In such an example, while sound production may be impacted, the mobile computing device may beneficially increase its cooling capacity, which may help to preserve circuitry to continue execution of one or more computing tasks (e.g., communication, storage, application, etc.). In such an example, where one or more temperatures decrease, the fan may decrease and the valve may close to restore sound production of the internal acoustic enclosure. As an example, a valve may be temperature sensitive, for example, triggered to open or to close based on a reading from a temperature sensor and/or based on behavior of a temperature sensitive material (e.g., a memory metal, etc.).

As explained, an internal acoustic enclosure approach can alleviate use of a sub-enclosure that is a separate component or assembly that is to be received in a cavity of a mobile computing device. Such an approach can save space and mass by alleviating the sub-enclosure itself and, for example, by alleviating one or more features that are utilized to position and/or secure the sub-enclosure in the mobile computing device.

A sub-enclosure can be shaped to have a speaker driver attached where the sub-enclosure is a hollow plastic formed sub-enclosure. Such a sub-enclosure can be shaped to fit into an open space inside a housing (e.g., a chassis) using mounting brackets and/or screws (e.g., which may be bolts, etc.).

A sub-enclosure can be formed of a plastic that is a formulated to have a high sound reflectivity and formed to have a specific internal shape. To gain the best sound, the plastic sub-enclosure tends to be thick (e.g., thick walls) and rigid. When a comparison is made between a cavity and a sub-enclosure, five to fifteen percent of the cavity volume tends to occupied (e.g., wasted) on the plastic that forms the sub-enclosure (e.g., the sub-enclosure walls, mounting features, etc.).

Mobile computing devices with lesser sound production demands (e.g., low quality sound) may use a speaker driver in an open bay, which lacks seals and hence lacks air tightness. Further, such an open bay is not tuned in any manner to benefit sound production; rather, the open bay is merely an open space amongst various components in a housing that is available to accommodate the speaker driver. Sound production from such an approach does not compare to a sound production from a tuned cavity such as a tuned internal acoustic enclosure.

As an example, a housing can include one or more features that are engineered to form at least part of an internal acoustic enclosure for sound production. As an example, a speaker driver may be mounted onto or into a housing (e.g., a chassis) using an adhesive such that one or more bosses are not needed for mounting of the speaker driver. In such an example, the housing can form at least in part an internal acoustic enclosure for a speaker driver where the internal enclosure can be air tight, ported, fit with a passive driver, etc.

As an example, space can be gained by leaving out the shell plastic of a sub-enclosure of a speaker assembly. And, as explained, as an example, additional space and/or mass may be gained by foregoing mounting points and hardware that are for sub-enclosure mounting. As an example, a mobile computing device can include an integral internal acoustic enclosure that reduces a total number of parts when compared to a mobile computing device that includes a separate sub-enclosure.

As an example, a hard coating (e.g., a hard paint, etc.) may be applied to make various different parts that fit together, whether they be metal, plastic, or composite, reflect sound uniformly inside the internal enclosure.

As an example, one or more gaskets may be used, for example, at hard seams to provide a sealed internal enclosure.

As an example, a housing (e.g., a chassis) may be permanently welded (e.g., via heat, radiation, laser, etc.) to form a closed space with only a speaker grille to let sound out (e.g., an internal acoustic enclosure with only a vent, which may be a speaker grilled vent).

As an example, a mobile computing device may include a speaker diaphragm (e.g., a cone or membrane, etc.) that can be on an outside of a housing (e.g., a case, a chassis, etc.) rather than inside it. In such an example, a grille may cover the speaker diaphragm. For example, consider the speaker assembly 1340 of FIG. 13 where a grille can be part of the speaker assembly 1340. As an example, a grill may be part of a hatch that can fit into an opening of a cover (e.g., a shell, etc.).

As an example, a mobile computing device can include an internal acoustic enclosure that is defined by one or more components, seals, coatings, etc., that damp vibration as may be generated during operation of the mobile computing device. For example, consider a fan that may include one or more resonant operational points where vibration may be present. In such an example, an internal acoustic enclosure may be defined by one or more materials that damp one or more of the frequencies of the vibration(s). As an example, a material may be a damping material that damps vibration that is coated with an acoustic material on a side that forms part of an internal acoustic enclosure. For example, consider a sealant that is an acoustic sealant that can seal against air leakage and that can damp sound, including undesirable sound. Such an acoustic sealant may be coated on an internal acoustic enclosure side to increase its reflectiveness as to sound waves within the internal acoustic enclosure. In such an example, sound and/or vibration external to the internal acoustic enclosure can be damped while sound in the internal acoustic enclosure can reflect beneficially.

As mentioned, an internal acoustic enclosure may be open or closed with respect to acoustic porting. For example, consider a bass reflex system (e.g., a ported, vented box or reflex port) type of system that includes a type of speaker enclosure that uses a port (e.g., a hole or vent) cut into the enclosure, which can be paired with a section of tubing or pipe affixed to the port. In such an approach, the port enables sound from a rear side of a diaphragm of a speaker driver to increase efficiency of the system at low frequencies as compared to a typical sealed- or closed-box speaker or an infinite baffle mounting.

A reflex port is a distinctive feature of such an enclosure type where a design approach enhances reproduction of the lowest frequencies generated by a speaker driver. The port can include one or more tubes or pipes mounted in a front (baffle) or rear face of the enclosure. Depending on the relationships between driver parameters, the enclosure volume (and filling if any), and the tube cross-section and length, the efficiency can be substantially improved over the performance of a similarly sized sealed-box enclosure. As mentioned, an internal acoustic cavity can include one or more ports and optionally one or more plugs, which may provide for selective utilization of such one or more ports (e.g., making one or more selective ports operable ports).

As mentioned, an internal acoustic enclosure can be fit with one or more passive radiators. A passive radiator can be utilized to extend a system's low frequency response. As an example, a passive radiator can include use of one or more additional diaphragms (e.g., cones, etc.) in fluid communication with an internal acoustic enclosure. In such an approach, the one or more passive diaphragms do not have a magnet or voice coil and are not connected to a power amplifier. A passive radiator may be referred to as a drone (e.g., a drone cone). As an example, a mobile computing device can include an active speaker, an internal acoustic enclosure and a passive speaker.

As an example, a mobile computing device can include resonance absorption material, which may be positioned proximate to or adjacent to a speaker to dampen resonance.

As explained, the space behind a speaker driver (e.g., size, shape, proximity to the driver, etc.) can have an impact on performance of the speaker driver. Another factor can be mounting location relative to a user (e.g., whether facing a user, facing a supporting surface, etc.).

As an example, one or more speaker drivers can be positioned with respect to one or more microphones, for example, to reduce risk of feedback.

As an example, a grille can be utilized, which may be separate from a housing or an integral part of a housing that can help to reduce risk of damage to a speaker driver.

As an example, a grille or vent may be at least thirty percent open with respect to a face of a speaker driver (e.g., diaphragm area, frontal cone area, etc.). As an example, a speaker driver may be covered via a mesh screen, a perforated metal or alloy grille, etc.

As an example, an internal acoustic enclosure can be designed according to one or more of the Thiele/Small parameters. Thiele/Small parameters (T/S or TSP) are a set of electromechanical parameters that define a specified low frequency performance of a speaker driver. Using these parameters, a speaker designer may simulate the position, velocity and acceleration of the diaphragm, the input impedance and the sound output of a system that includes a speaker and an enclosure. TSP calculations can indicate how large a speaker enclosure will need to be and how large and long a bass reflex port should be if one is utilized.

Some of the Small parameters include: Sd—Projected area of the driver diaphragm, in square meters; Mms—Mass of the diaphragm/coil, including acoustic load, in kilograms; Mmd—Mass of the diaphragm/coil alone is known as Mmd; Cms—Compliance of the driver's suspension, in meters per newton (the reciprocal of its stiffness); Rms—The mechanical resistance of a driver's suspension (lossiness) in N·s/m; Le—Voice coil inductance measured in millihenries (mH) (e.g., measured at 1 kHz); Re—DC resistance of the voice coil, measured in ohms; Bl—The product of magnet field strength in the voice coil gap and the length of wire in the magnetic field, in tesla-meters (T·m); and Vas—The volume of air which creates the same amount of compliance as the speaker's physical suspension.

As an example, a device can include a housing that includes a bottom shell, a top shell and at least one shell opening; a processor disposed in the housing; memory accessible to the processor and disposed in the housing; audio circuitry disposed in the housing and operatively coupled to the processor; a human interface unit mounted to the housing, operatively coupled to the processor and accessible via the top shell of the housing; a speaker driver mounted to the housing and operatively coupled to the audio circuitry, where the speaker driver is in fluid communication with the at least one shell opening; and an internal acoustic cavity defined by the bottom shell and the top shell, where the internal acoustic cavity is in fluid communication with the speaker driver.

As an example, a top shell can be formed at least in part by a display, which may be a human interface unit, where, for example, the top shell can cover and, for example, seal a bottom shell. For example, consider a tablet device where a display is assembled with a bottom shell to form a housing for components of the tablet device. In such an example, a portion of the top shell may be substantially planar (e.g., substantially flat) and may form a seal with an upper perimeter of features of the bottom shell that are shaped to define at least a portion of an internal acoustic cavity. For example, in the example of FIG. 13, a substantially flat component may be utilized to cover the cavity 1303 to form an internal acoustic cavity. In such an example, consider the substantially flat component as being a battery, a display, a portion of a board, etc. Where the component is a display, the display can include an internal side and an external side where the internal side may be utilized to cover the cavity 1303 to form an internal acoustic cavity.

As an example, a device can include a bottom shell that includes a bottom side wall and one or more integral walls that extend outwardly from the bottom side wall to define at least a portion of an internal acoustic cavity. In such an example, the bottom shell may be formed of a molded polymeric material.

As an example, a top shell can include a top side wall and one or more integral walls that extend outwardly from the top side wall to define at least a portion of an internal acoustic cavity. In such an example, the top shell may be formed of a molded polymeric material.

As an example, a bottom shell can include a bottom side wall and one or more integral walls that extend outwardly from the bottom side wall, where a top shell that mates with the bottom shell, includes a top side wall and one or more integral walls that extend outwardly from the top side wall, where the integral walls define a lateral extent of an internal acoustic cavity between the bottom side wall and the top side wall.

As an example, a top shell can be a molded polymeric shell and a bottom shell can be a molded polymeric shell.

As an example, an internal acoustic cavity can be a first internal acoustic cavity defined by a bottom shell and a top shell and a device can further include a second internal acoustic cavity defined by the bottom shell and the top shell.

As an example, a human interface unit can be a keyboard. As an example, a human interface unit can be a display. As an example, a human interface unit can be a touchpad. As an example, a human interface unit can be disposed in a top shell or operatively coupled to a top shell. As an example, a top shell may be defined in part by a human interface unit. For example, consider a display that is a human interface unit that defines at least in part a top shell. As an example, where a human interface unit is a keyboard, in a plan view of a housing, a speaker driver may be offset from an area of the keyboard (e.g., towards a front edge, towards a back edge, toward a side edge, etc.). As an example, an internal acoustic cavity may span a distance from an inner surface of a bottom shell to an inner surface of a top shell.

As an example, an internal acoustic cavity can be bossless.

As an example, an internal acoustic cavity can be an air tight volume where, for example, a speaker driver is disposed between the air tight volume and at least one of one or more shell openings, which may include, for example, one or more openings of a hatch that can be fit into a hatch opening to form at least a portion of a shell.

As an example, a bottom shell and a top shell can be joined at an air tight interface to define an internal acoustic cavity. As an example, an internal acoustic cavity can include an air tight interface formed via an air sealant material. As an example, an air sealant material can include a weld formed by material of at least one of the top shell and the bottom shell. As an example, an air sealant material can include an acoustic caulk where, for example, the acoustic caulk contacts the top shell and a bottom shell. As an example, an air sealant material can include a gasket where, for example, the gasket contacts a top shell and a bottom shell. As an example, an air sealant material can include a latex material.

As an example, a device can include a lithium ion battery that can include a flexible pouch. In such an example, such a device can include an air sealant material that is in contact with the flexible pouch and in contact with a housing, where the air sealant material forms an air tight interface of an internal acoustic cavity.

As an example, a device can include a passive radiator (e.g., a passive acoustic radiator). As an example, a device can include a port (e.g., an acoustic port).

As an example, a device can include an internal acoustic cavity that includes a valve that is in fluid communication with a fan cooling passage. In such an example, air pressure in the fan cooling passage may control the valve to transition the valve from a closed state to an open state where, in the open state, the fan cooling passage is in fluid communication with an internal acoustic cavity and/or temperature may control the valve to transition the valve from a closed state to an open state where, in the open state, the fan cooling passage is in fluid communication with the internal acoustic cavity. In such examples, an internal acoustic cavity may provide for thermal management of a device (e.g., increasing heat transfer surface area, etc.).

As an example, a device can include an acoustic coating material that covers at least a portion of a housing that forms at least a portion of an internal acoustic cavity.

As an example, a device can include an adhesive that adheres a speaker driver to a housing to mount the speaker driver to the housing. In such an example, the adhesive may be utilized to secure the speaker driver to the housing before a top shell and a bottom shell are joined. As an example, where a device includes a hatch, the hatch may be positioned to allow for adhering a speaker driver.

As an example, a device can include an internal acoustic cavity that can be bossless where, for example, a speaker driver can be mounted to a housing of the device without a boss of the housing of the device.

As an example, a speaker driver can be attached to a hatch where the hatch covers a hatch opening of an internal acoustic cavity of a device, which may be defined as an opening in a shell (e.g., a cover) of a housing of the device.

As an example, an internal acoustic cavity of a device can have a volume less than approximately 6 cubic centimeters. As an example, an internal acoustic cavity can have a volume less than approximately 3 cubic centimeters.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 14:
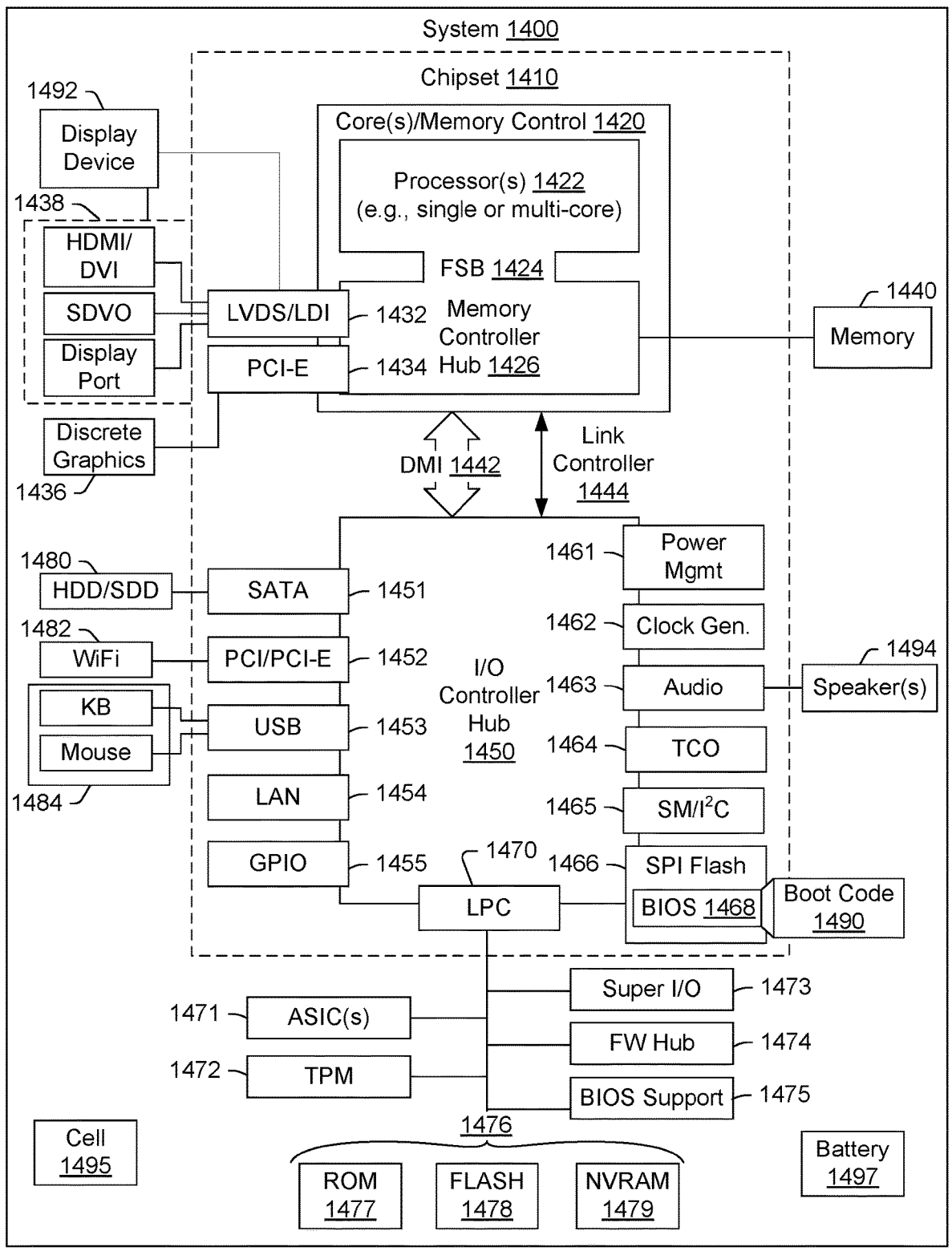
FIG. 14 is a diagram of an example of a system that includes one or more processors.

While various examples of circuits or circuitry have been discussed, FIG. 14 depicts a block diagram of an illustrative computer system 1400. The system 1400 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1400.

As shown in FIG. 14, the system 1400 includes a so-called chipset 1410. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 14, the chipset 1410 has a particular architecture, which may vary to some extent depending on brand or manufacturer. The architecture of the chipset 1410 includes a core and memory control group 1420 and an I/O controller hub 1450 that exchange information (e.g., data, signals, commands, etc.) via, for example, a direct management interface or direct media interface (DMI) 1442 or a link controller 1444. In the example of FIG. 14, the DMI 1442 is a chip-to-chip interface (sometimes referred to as being a link between a "northbridge" and a "southbridge").

The core and memory control group 1420 include one or more processors 1422 (e.g., single core or multi-core) and a memory controller hub 1426 that exchange information via a front side bus (FSB) 1424. As described herein, various components of the core and memory control group 1420 may be integrated onto a single processor die, for example, to make a chip that supplants the conventional "northbridge" style architecture.

The memory controller hub 1426 interfaces with memory 1440. For example, the memory controller hub 1426 may provide support for DDR SDRAM memory (e.g., DDR, DDR2, DDR3, etc.). In general, the memory 1440 is a type of random-access memory (RAM). It is often referred to as "system memory".

The memory controller hub 1426 further includes a low-voltage differential signaling interface (LVDS) 1432. The LVDS 1432 may be a so-called LVDS Display Interface (LDI) for support of a display device 1492 (e.g., a CRT, a flat panel, a projector, etc.). A block 1438 includes some examples of technologies that may be supported via the LVDS interface 1432 (e.g., serial digital video, HDMI/DVI, display port). The memory controller hub 1426 also includes one or more PCI-express interfaces (PCI-E) 1434, for example, for support of discrete graphics 1436. Discrete graphics using a PCI-E interface has become an alternative approach to an accelerated graphics port (AGP). For example, the memory controller hub 1426 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1450 includes a variety of interfaces. The example of FIG. 14 includes a SATA interface 1451, one or more PCI-E interfaces 1452 (optionally one or more legacy PCI interfaces), one or more USB interfaces 1453, a LAN interface 1454 (more generally a network interface), a general purpose I/O interface (GPIO) 1455, a low-pin count (LPC) interface 1470, a power management interface 1461, a clock generator interface 1462, an audio interface 1463 (e.g., for speakers 1494), a total cost of operation (TCO) interface 1464, a system management bus interface (e.g., a multi-master serial computer bus interface) 1465, and a serial peripheral flash memory/controller interface (SPI Flash) 1466, which, in the example of FIG. 14, includes BIOS 1468 and boot code 1490. With respect to network connections, the I/O hub controller 1450 may include integrated gigabit Ethernet controller lines multiplexed with a PCI-E interface port. Other network features may operate independent of a PCI-E interface.

The interfaces of the I/O hub controller 1450 provide for communication with various devices, networks, etc. For example, the SATA interface 1451 provides for reading, writing or reading and writing information on one or more drives 1480 such as HDDs, SDDs or a combination thereof. The I/O hub controller 1450 may also include an advanced host controller interface (AHCI) to support one or more drives 1480. The PCI-E interface 1452 allows for wireless connections 1482 to devices, networks, etc. The USB interface 1453 provides for input devices 1484 such as keyboards (KB), one or more optical sensors, mice and various other devices (e.g., microphones, cameras, phones, storage, media players, etc.). On or more other types of sensors may optionally rely on the USB interface 1453 or another interface (e.g., I²C, etc.). As to microphones, the system 1400 of FIG. 14 may include hardware (e.g., audio card) appropriately configured for receipt of sound (e.g., user voice, ambient sound, etc.).

In the example of FIG. 14, the LPC interface 1470 provides for use of one or more ASICs 1471, a trusted platform module (TPM) 1472, a super I/O 1473, a firmware hub 1474, BIOS support 1475 as well as various types of memory 1476 such as ROM 1477, Flash 1478, and non-volatile RAM (NVRAM) 1479. With respect to the TPM 1472, this module may be in the form of a chip that can be used to authenticate software and hardware devices. For example, a TPM may be capable of performing platform authentication and may be used to verify that a system seeking access is the expected system.

The system 1400, upon power on, may be configured to execute boot code 1490 for the BIOS 1468, as stored within the SPI Flash 1466, and thereafter processes data under the control of one or more operating systems and application software (e.g., stored in system memory 1440). An operating system may be stored in any of a variety of locations and accessed, for example, according to instructions of the BIOS 1468. Again, as described herein, a satellite, a base, a server or other machine may include fewer or more features than shown in the system 1400 of FIG. 14. Further, the system 1400 of FIG. 14 is shown as optionally include cell phone circuitry 1495, which may include GSM, CDMA, etc., types of circuitry configured for coordinated operation with one or more of the other features of the system 1400. Also shown in FIG. 14 is battery circuitry 1497, which may provide one or more battery, power, etc., associated features (e.g., optionally to instruct one or more other components of the system 1400). As an example, a SMBus may be operable via a LPC (see, e.g., the LPC interface 1470), via an I²C interface (see, e.g., the SM/I²C interface 1465), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
   a housing that comprises a bottom shell, a top shell and at least one shell opening;
   a processor disposed in the housing;
   memory accessible to the processor and disposed in the housing;
   audio circuitry disposed in the housing and operatively coupled to the processor;
   a keyboard mounted to the housing, operatively coupled to the processor and accessible via the top shell of the housing;
   a speaker driver without a sub-enclosure, wherein the speaker driver is operatively coupled to the audio circuitry and comprises a front, diaphragm side and a back side;
   an adhesive on the front, diaphragm side of the speaker driver; and
   a bossless internal acoustic cavity defined by the bottom shell and the top shell, wherein the bossless internal acoustic cavity is in fluid communication with at least one of the at least one shell opening, wherein the speaker driver without a sub-enclosure is mounted in the bossless internal acoustic cavity via the adhesive and in fluid communication with the at least one of the at least one shell opening, wherein the bottom shell comprises a bottom side wall and one or more integral walls that extend outwardly from the bottom side wall to define at least a portion of the bossless internal acoustic cavity, wherein the top shell comprises a top side wall and one or more integral walls that extend outwardly from the top side wall to define at least a portion of the bossless internal acoustic cavity, and wherein the integral walls define a lateral extent of the bossless internal acoustic cavity between the bottom side wall and the top side wall.

2. The device of claim 1 wherein the bottom shell is formed of a molded polymeric material.

3. The device of claim 1 wherein the top shell is formed of a molded polymeric material.

4. The device of claim 1 wherein the top shell is a molded polymeric shell and wherein the bottom shell is a molded polymeric shell.

5. The device of claim 1 wherein the bossless internal acoustic cavity is a first bossless internal acoustic cavity and further comprising a second bossless internal acoustic cavity defined by at least one of the bottom shell and the top shell.

6. The device of claim 1 comprising a display.

7. The device of claim 1 wherein the bossless internal acoustic cavity is an air tight volume and wherein the speaker driver is disposed between the air tight volume and the at least one of the one or more shell openings.

8. The device of claim 1 wherein the bottom shell and the top shell are joined at an air tight interface to define the bossless internal acoustic cavity.

9. The device of claim 1 wherein the bossless internal acoustic cavity comprises an air tight interface formed via an air sealant material.

10. The device of claim 9 wherein the air sealant material comprises a weld formed by material of at least one of the top shell and the bottom shell.

11. The device of claim 9 wherein the air sealant material comprises a gasket.

12. The device of claim 11 wherein the gasket contacts the top shell and the bottom shell.

13. The device of claim 1 comprising a lithium ion battery.

14. The device of claim 1 comprising an acoustic coating material that covers at least a portion of the housing that forms at least a portion of the bossless internal acoustic cavity.

15. The device of claim 1 wherein the speaker driver is mounted via the adhesive to a hatch, wherein the hatch is received by a hatch opening of at least one of the bottom shell and the top shell.

* * * * *